(12) United States Patent
Kumar

(10) Patent No.: US 9,386,003 B2
(45) Date of Patent: Jul. 5, 2016

(54) SYSTEM AND METHOD FOR SECURE TRANSACTIONS

(71) Applicant: Tango Mobile, LLC, Marina Del Ray, CA (US)

(72) Inventor: Himalesh Cherukuvada Kumar, Marina Del Ray, CA (US)

(73) Assignee: Tango Mobile, LLC, Marina Del Rey, CA (US)

( * ) Notice: Subject to any disclaimer, the term of this patent is extended or adjusted under 35 U.S.C. 154(b) by 0 days.

(21) Appl. No.: 14/420,996

(22) PCT Filed: Aug. 13, 2013

(86) PCT No.: PCT/US2013/054759
§ 371 (c)(1),
(2) Date: Feb. 11, 2015

(87) PCT Pub. No.: WO2014/028510
PCT Pub. Date: Feb. 20, 2014

(65) Prior Publication Data
US 2015/0237026 A1    Aug. 20, 2015

Related U.S. Application Data

(60) Provisional application No. 61/779,237, filed on Mar. 13, 2013, provisional application No. 61/753,561, filed on Jan. 17, 2013, provisional application No. 61/683,954, filed on Aug. 16, 2012.

(51) Int. Cl.
*G06F 7/04* (2006.01)
*H04L 29/06* (2006.01)
*G06Q 20/40* (2012.01)
*G06F 21/31* (2013.01)
*G06F 21/44* (2013.01)

(52) U.S. Cl.
CPC ............... *H04L 63/08* (2013.01); *G06F 21/31* (2013.01); *G06F 21/44* (2013.01); *G06Q 20/4014* (2013.01)

(58) Field of Classification Search
CPC ............................. G06F 21/10; G06F 21/31
USPC ............................................ 726/26–30
See application file for complete search history.

(56) References Cited

U.S. PATENT DOCUMENTS

| 6,938,019 B1 | 8/2005 | Uzo |
| 7,000,116 B2 | 2/2006 | Bates et al. |
| 7,860,753 B2 | 12/2010 | Walker et al. |
| 7,904,344 B2 | 3/2011 | Philyaw |
| 8,032,927 B2 | 10/2011 | Ross |
| 8,170,527 B2 | 5/2012 | Granucci et al. |

(Continued)

OTHER PUBLICATIONS

International Searching Authority, International Search Report for corresponding application PCT/US2013/054766 mailed Mar. 18, 2014, 1pg.

(Continued)

*Primary Examiner* — Anthony Brown
(74) *Attorney, Agent, or Firm* — Duane Morris LLP

(57) ABSTRACT

The present disclosure describes systems and methods directed towards a highly secure and intelligent, end to end provisioning, authentication, and transaction system which creates and/or consolidates user data for a unified profile for the user (e.g., a person, place, organization, object, etc.) to allow for the safe, secure, and verifiable exchange of information.

28 Claims, 23 Drawing Sheets

(56) References Cited

U.S. PATENT DOCUMENTS

| | | |
|---|---|---|
| 2002/0083178 A1 | 6/2002 | Brothers |
| 2003/0014372 A1 | 1/2003 | Wheeler et al. |
| 2003/0159032 A1 | 8/2003 | Gerck |
| 2006/0165060 A1 | 7/2006 | Dua |
| 2006/0173794 A1 | 8/2006 | Sellars et al. |
| 2007/0255662 A1 | 11/2007 | Tumminaro |
| 2008/0052514 A1 | 2/2008 | Nakae |
| 2008/0189360 A1 | 8/2008 | Kiley et al. |
| 2008/0208743 A1 | 8/2008 | Arthur et al. |
| 2009/0119190 A1 | 5/2009 | Realini |
| 2009/0132813 A1 | 5/2009 | Schibuk |
| 2009/0260064 A1 | 10/2009 | McDowell et al. |
| 2011/0072274 A1 | 3/2011 | Leoutsarakos et al. |
| 2011/0087877 A1 | 4/2011 | Dagg et al. |
| 2011/0289001 A1 | 11/2011 | Bishop et al. |
| 2012/0030366 A1 | 2/2012 | Collart et al. |
| 2012/0054841 A1 | 3/2012 | Schultz et al. |
| 2012/0078752 A1 | 3/2012 | Hultberg et al. |
| 2012/0084131 A1 | 4/2012 | Bergel et al. |
| 2012/0089469 A1 | 4/2012 | Bonalle et al. |
| 2012/0116959 A1 | 5/2012 | Pitroda et al. |
| 2012/0130904 A1 | 5/2012 | Weiss |
| 2012/0150742 A1 | 6/2012 | Poon et al. |
| 2012/0150748 A1 | 6/2012 | Law et al. |
| 2012/0150750 A1 | 6/2012 | Law et al. |
| 2012/0158589 A1 | 6/2012 | Katzin et al. |
| 2012/0185398 A1 | 7/2012 | Weis et al. |
| 2012/0198241 A1 | 8/2012 | O'Hare et al. |
| 2012/0293465 A1* | 11/2012 | Nandu .................. H04W 4/003 345/204 |
| 2014/0006951 A1* | 1/2014 | Hunter .................. H04H 60/31 715/719 |

OTHER PUBLICATIONS

International Searching Authority, International Search Report for corresponding application PCT/US2013/054759 mailed Feb. 27, 2014, 2pgs.

International Searching Authority, International Search Report for corresponding application PCT/US2013/054769 mailed Dec. 6, 2013, 1pg.

* cited by examiner

SYSTEM AND METHOD FOR SECURE TRANSACTIONS

RELATED AND CO-PENDING APPLICATIONS

This application is a U.S. national stage application of and claims priority to PCT application Serial Number PCT/US2013/054759 entitled "System and Method for Secure Transactions" filed 13 Aug. 2013 which claims priority to each of the following co-pending U.S. provisional applications: "System and Method for a Secure Mobile Application", Ser. No. 61/683,954 filed 16 Aug. 2012; "System and Method for a Secure Transactional Platform", Ser. No. 61/753,561 filed 17 Jan. 2013; and "System and Method for Mobile Credentials and Transactions", Ser. No. 61/779,237 filed 13 Mar. 2013, the entirety of each of the above applications is hereby incorporated herein by reference.

This application hereby incorporates by reference the entirety of each of the following two applications which are filed concurrently herewith: U.S. national stage application Ser. No. 14/421,005 filed 11 Feb. 2015 entitled "System and Method for Electronic Credentials" which is a U.S. national stage application of PCT application Serial Number PCT/US2013/054766 filed 13 Aug. 2013 entitled "System and Method for Electronic Credentials"; and U.S. national stage application Ser. No. 14/421,013 filed 11 Feb. 2015 entitled "System and Method for Mobile or Web-Based Payment/Credential Process" which is a U.S. national stage application of PCT application Serial Number PCT/US2013/054769 filed 13 Aug. 2013 entitled "System and Method for Mobile or Web-Based Payment/Credential Process".

BACKGROUND

Current systems and methods incorporating traditional identification documents and/or credentials (referred to herein as, "ID") include a set of defined relationships between certain persons/entities that delineate particular expectations amongst the certain persons/entities. These expectations may include, but are not limited to, such things as identification, verification, access, rights, privileges, payments, debits, credits, etc. between at least two of the owner of the ID, the issuer of the ID, and one who is inspecting the ID to verify the owner's proper status/qualifications/certification.

As a simple example, a traditional ID such as a driver's license is issued by an appropriate state department of motor vehicles ("DMV") to a driver once the driver, typically, has met the DMV's requirements. Therefore, the DMV is satisfied of the driver's identity and qualifications and the driver is presented with the license to use as a token of the DMV's confidence in the driver's identity and qualifications. The driver may then use the driver's license to identify himself to a third party to verify, for example, the driver's age with the expectation that the verifying party will accept the license and accept that the information contained thereon is not false. The verifying party, upon inspection of the driver's license, will acknowledge that the driver's license is legitimate and that the driver proffering the license is the age represented by the birth date on the driver's license. Thus, the DMV, the driver, and the verifying party can satisfactorily rely upon the token (driver's license) as an authoritative and true representation of the information carried thereon. While the traditional document token system is useful for a limited set of conventional transaction types, the traditional document token system is becoming outmoded in the digital information age and cannot be effectively used for novel secure transactions and other innovative purposes, such as, for example, transactions that require user identification from a distance.

Current electronic ID systems and methods employ essentially the same type of process as that described above with an ID issuer, and ID owner, and an ID verifying party. The only difference is that the ID is electronic rather than a physical token. Due to the spate of computer hacking, identification theft, and other electronic scams, the current electronic ID systems are vulnerable to attack and unauthorized manipulation. Thus, current electronic ID systems and methods suffer similar limitations as the traditional document token systems and cannot be effectively used for more innovative purposes. Furthermore, current electronic ID systems have suffered a concomitant loss of consumer confidence in the accuracy and reliability of the electronic IDs.

Accordingly, there is a need for secure, reliable, and accurate electronic ID systems and methods that meet current consumer needs as well as the demands of novel identification techniques, secure transactions, and usages for the future.

DETAILED DESCRIPTION

Figure 1:
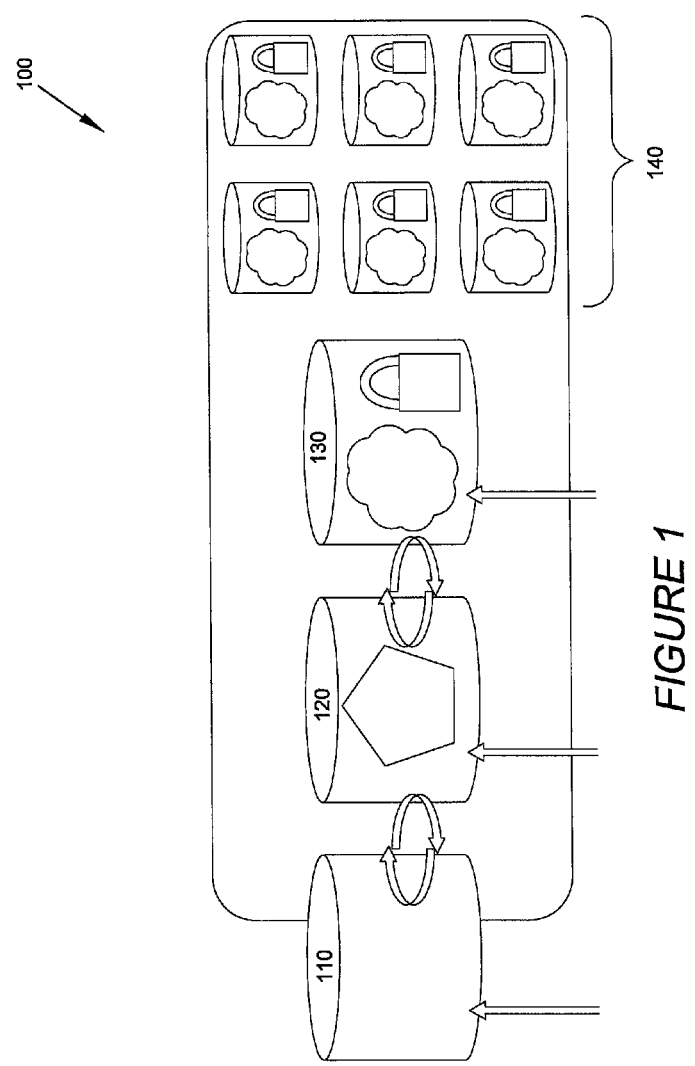
FIG. 1 is a block diagram of a secure data/credential storage system according to an embodiment of the present subject matter.

The following description of the present subject matter is provided as an enabling teaching of the present subject matter and its best, currently-known embodiment. Those skilled in the art will recognize that many changes can be made to the embodiments described herein while still obtaining the beneficial results of the present subject matter. It will also be apparent that for some embodiments, some of the desired benefits of the present subject matter can be obtained by selecting some of the features of the present subject matter without utilizing other features. Accordingly, those skilled in the art will recognize that many modifications and adaptations of the present subject matter are possible and may even be desirable in certain circumstances and are part of the present subject matter. Thus, the following description is provided as illustrative of the principles of the present subject matter and not in limitation thereof and may include modification thereto and permutations thereof. While the following exemplary discussion of embodiments of the present subject matter may be directed towards or reference specific systems and methods of electronic identification and secure transactions, it is to be understood that the discussion is not intended to limit the scope of the present subject matter in any way and that the principles presented are equally applicable to other systems and method of electronic identification and secure transactions.

Those skilled in the art will further appreciate that many modifications to the exemplary embodiments described herein are possible without departing from the spirit and scope of the present subject matter. Thus, the description is not intended and should not be construed to be limited to the examples given but should be granted the full breadth of protection afforded by the appended claims and equivalents thereto.

With reference to the figures where like elements have been given like numerical designations to facilitate an understanding of the present subject matter, various embodiments of a system and method for secure transactions are described.

Embodiments of the present system and method described herein are directed towards a highly secure and intelligent, end to end provisioning and authentication system (sometimes referred to herein as the "Tango Secure Environment" or "TSE"). The TSE is typically organized, set up, initiated, and operated by a TSE Authority. Embodiments of the system and method are useful to achieve, among other things, the following tasks: interactions with people, places, organizations, and/or objects to verify their identity/credentials accurately; create and/or consolidate data for a unified profile for the person, place, organization, and/or object; allow for safe/accurate exchange of information between profiles for use within the system and with other systems; and increase current levels of verification and security.

In certain embodiments, the present disclosure incorporates different levels of data that are absorbed and/or used/passed through during an exchange or verification of data. For example, the present disclosure uses Identifiers that are composed of data that is collected and/or created by the system and stored in the users' profile on the system database (sometimes referred to herein as the "Tango Secure Database" or "TSDB") to accurately identify a user to fulfill a system process. The Identifiers may be derived and/or tokenized from user-unique information and may be created by using a hash function or other one-way function as is known in the art. Identifiers may include confidential data of the user such as, but not limited to, information from one or more of the following:

Issued IDs—physical IDs issued by another party such as driver's license, passport, library cards, etc.;
Non-Physical IDs—virtual credentials such as username/password, email, PIN, etc.;
Financial Data—financial credentials and account information for credit card, rewards card, bank account, gift card, etc.;
Keys—physical and/or virtual credentials utilized by a third party to grant access;
Other—all other data known and unknown which may uniquely identify a user independently or collectively such as social security number, date of birth, home address, picture, biometric data, etc.

Since an electronic ID typically not only encompasses one ID and/or Credential to one user, and since the issuer of the ID/Credential may not want to manage electronic dissemination of those IDs, and since there must be a provisioning of the ID(s)/Credential(s) to the user, there must be a trusted service manager (e.g., the "TSE Authority") to act as the "provisioner" and manager of all ID/Credentials of one user. This creates a Universal Electronic ID system that allows the user to securely manage all ID/Credentials they may own, under one electronic ID account. The account manager (e.g., TSE Authority) would act as a manager to securely store and/or provision any of the user's approved electronic devices(s) and/or third party electronic device(s) with the ID/Credentials, as well as be the clearing house between the credential issuer, the user, and any party that is requesting the legitimacy, authority, and/or sovereignty of the ID/Credential.

It is important to note that, as used herein, using an electronic ID/Credential encompasses more than simply placing an ID on a user's mobile device and/or any electronic system, or issuing an ID for placement onto a user's mobile device and/or any electronic system, but rather embodiments of the disclosed system and method include a complex connection and communication of electronic systems coming together to display sovereign issuance of ID/Credentials, prove Identity, ownership, and/or authority for a person, place, or thing. In doing so, the outcome allows the person, place, or thing that proved/verified its identity and/or ownership to engage and benefit from services and/or products of some kind offered by the party that requested the user's proof of identity and/or ownership.

In certain embodiments, functions of the disclosed system and method may been seen as somewhat similar to that of an issued or created identification of a person, place, or thing by a valid issuer such as, but not limited to, drivers licenses, passports etc. However, the novel electronic ID/credential system and methods discussed herein are not only an electronic version of the same static physical ID document(s) which holds some of the same data, but also possess dynamic properties due to the inherent and/or designed-in technological capabilities. Some of these properties are, but not limited to, securely provisioning the IDs remotely in various ways, renewing an ID/credential, remotely issuing and/or revoking an ID/credential, etc.

In addition to physical ID document(s), in certain embodiments, electronic ID/credentials also act as "digital keys" that give the correct credentials of a person, place, or thing to allow access to various access-controlled environments such as, but not limited to, home, cars, buildings, etc. Moreover, electronic ID/credential systems may also encompass credentials that may or may not be physical in nature, but also allow a person, place or thing to access protected products and services such as websites, e-mail accounts, bank account(s), computers, etc.

The electronic ID/credential system described herein not only includes physical/non-tangible IDs and credentials, it also stores any data of any kind associated to a particular person, place, or thing. In certain embodiments, the novel system and method stores tokens and other data that, although may not reveal an identification of a person, may reveal an identification of a person's accounts. The novel system and method may also store payment accounts such as, but not limited to, credit cards, charge cards, gift cards, bank accounts, PayPal accounts, etc., as well as other closed-looped or open-looped payment schemes that identify a user's account(s).

In certain embodiments, the present disclosure uses Response Data which includes all data types that may be given by the TSE to fulfill a TSE process. Response Data may include information from one or more of the following:

Actual Data—actual data includes that data which would simply be the pass through of unaltered Identifiers from the TSDB to necessary connections;

Universal ID (also referred to as User Unique ID or User Universal ID)—this is a TSE-created unique code (e.g., number);

Tokenized Data—this includes Actual Data input into the system and manipulated to put the Actual Data in a series of indexes to thereby create a unique number that does not contain the Actual Data;

Derivative Data—this includes Actual Data input into the system and manipulated to put Actual Data through a series of algorithms (e.g., hashing algorithms that take the Actual Data and Universal ID as inputs) to create new Identifiers;

Certificate ID—this contains information regarding a particular transaction which is currently taking place or has taken place in order to provision a certain data set with the appropriate entity, it is provided to certain entities to provide a higher level of authentication;

In certain embodiments, Actual Data (e.g., the actual ID/credential of a user and/or the user's data) may not be held by the user's mobile device. Depending on the specific need and the user's desire, all actual data can be accessed and sent to the user's mobile device when needed, with proper authentication. This data may or may not be encrypted on the mobile device. If the user wishes, the Actual Data can be given to a third party in any manner the user sees fit. The TSE Authority may be the manager and digital issuer of the data, however the user is the owner of the data and the TSE is designed only to assist the user in handling the data and in making the process of storage and provisioning the user's data safe, secure, verifiable, and fast.

In certain embodiments, each user will be given a unique Electronic/Digital ID identifier, the Universal ID, once the user registers with the TSE. This unique Identifier will be linked to the user's account(s). All ID/Credential and user data (e.g., Actual Data) will be linked to the unique ID identifier for that user and their account. As a non-limiting example, if a third party requests certain data from the user, the third party will connect to the TSDB and provide the TSDB with its third party ID, the user's unique Electronic/Digital ID, and the type of data being requested. If the transaction is approved and authorized, the TSDB will pull up the requested data and complete the transaction with the third party.

In certain embodiments, the TSDB can also tokenize and/or encrypt some or all ID/Credential data on the TSDB and/or the TSE and/or the user's mobile device. In doing so, the TSDB and/or TSE will create a token and/or public key(s) which will identify the user and the Actual Data on the TSDB and/or TSE. This may be accomplished by taking the Actual Data and tokenizing the Actual data by placing it into an algorithm (e.g., hashing algorithm).

In certain embodiments, the TSDB and/or TSE may also create and/or issue Derivative Data, where Derivative Data is a derivative of the ID/Credential(s) (i.e., not a token based system as described above). As a non-limiting example, Derivative Data is created by taking the Actual Data and the User Universal ID and placing both into an algorithm (e.g., hashing algorithm). One purpose of creating Derivative Data, among other reasons, would be to use the ID/Credentials while at the same time protecting the sensitive root data of the ID/Credential itself. If needed, the TSDB and/or TSE can create an unlimited number of unique derivative IDs for the same ID/Credential (which may be referred to herein as Multiple Unique Derivative IDs). As a non-limiting example, Multiple Unique Derivative IDs may be created by taking the Actual Data, the User Universal ID and the third party ID (which is typically unique for each separate third party) and placing each into an algorithm. Thus, a unique derivative ID is created for each separate third party based on the same root data (e.g., the same Actual Data and User Universal ID). In this way (and only if needed), all approved third parties will be given a unique derivative ID number of the same user ID/Credential saved on the TSDB and/or TSE. By doing so, the Multiple Unique Derivative ID will display the user, ID/Credential Data, and the third party to whom the Multiple Unique Derivative ID was issued. Therefore, each third party is provided with a unique derivative ID for the same ID/Credential of the user, and, consequently, third parties cannot share user data. This scheme also prevents authorized parties from deciphering user data without first acquiring approval from the TSDB and/or TSE. Moreover, if necessary a particular multiple derivative ID can be connected to the specific third party.

In certain embodiments, in addition to the user unique ID identifier, tokens, derivative, Multiple Unique Derivative ID, and the actual ID/Credential data on the TSDB and/or the TSE, the TSDB and/or TSE (specifically, in an embodiment, the TIS) may issue an Electronic/Digital Issuance Certificate ID. This Electronic/Digital Issuance Certificate ID is not part of the root data itself (e.g., a driver's license number, or token of the driver's license created by the TSE and/or TSDB), but rather the Electronic/Digital Issuance Certificate ID is a unique identifying code/number that was created to provided authenticity and reference of the root ID/Credential documentation from the issuer, trusted digital manager, and/or user account to which it was provisioned as well as to the user. This number is given to prove that the TSE and/or TSDB has provisioned and/or created a digital copy and can be viewed as a digital finger print of sorts of the ID/Credentials and user data.

In certain embodiments, the present disclosure uses one or more of various Response Types. Response Types are the responses the TSE will provide to entities. The requester of information will also have a TSE profile which contains stored procedures allowed for that requester by the TSE. Response Types may include information from one or more of the following:

Authorizations—this includes a set of responses containing a Yes/No and/or Approval/Denial-type response;

Release of Data—this is a response which includes Response Data, multiple Response Data may be packaged together and sent to a requester. This Response Type may be referred to as a Level Request.

As a non-limiting example, with user and TSDB and/or TSE approval, the user and/or a third party may request that along with, or instead of, the data being transferred a "confirmation response" communication be sent. The confirmation response may include, for example, Actual Data, Token, User Universal ID, Derivative, Multiple Unique Derivative ID, and/or Electronic/Digital Issuance Certificate ID as well as a simple Yes or No, or Approval or Denial indication (or binary equivalents such as '0' or '1'). In certain embodiments, the confirmation response only includes a Yes/No or Approval/Denial indication. Additionally, a Level Request may optionally be included.

As a non-limiting example of a Yes/No or Approval/Denial confirmation response, a Yes/No request and/or confirmation response will not send any user data (e.g., actual data, tokenized data, derivative data, etc.) but rather will only contain a simple Yes or No to a question about user data. As a non-limiting example, a third party data request may be "Verify the user is OLDER than 21 years, YES OR NO." The confirmation response sent to the third party will not send the user's actual birth date, but rather the confirmation response will only include a "YES" or "NO" response to the question. Similarly, a third party can request an "Approval or Denial" of a requested transaction, such as, but not limited to, a credit card sale. The confirmation response sent to the third party would simply include "APPROVED" or "DENIED".

Another Response Type mentioned above is a Level Request. The TSDB and/or TSE may organize into sets ("level sets") certain data groups. In some cases, these level sets are comprised of data that are, e.g., most requested, user authorized, user defined, etc. Such data may be organized into level sets corresponding to, for example, respective security/permission settings or respective functionality capabilities. A third party can request that a level set of data be sent to the third party when a user connects and approves the data transfer with the third party. This approval can be accomplished on a mobile device, website, terminal, POS (point of sale) device, electronic device, etc.

Tango Secure Environment ("Tse")

The hardware makeup, data, intelligent system, and process flows/stored procedures are included in the TSE. In some embodiments, the TSE includes:

Tango Secure Database ("TSDB")—In certain embodiments, the TSDB is a collection of databases which contain Identifiers of an entity, sometimes referred to herein as a "Tango Profile" for the identified entity. Data is separated by security levels and requires the Tango Intelligent System ("TIS") to properly locate the data.

Tango Intelligence System ("TIS")—In certain embodiments, the TIS is a set of stored procedures and processes which analyze the data and requests received and communicates with the TSDB to retrieve necessary Identifiers to fulfill a response. TIS is responsible for the creation and communication of Response Data. In certain embodiments, Response Data is never stored on the TSDB. The TIS may also take in Identifiers of requesters in order to analyze and approve the requests sent by the requesters. Highest level authentication may require manual approval and will not be proceeded further by the TIS.

The TIS, in certain embodiments, controls and securely stores procedures and user data (via the TSS and/or DSS (discussed below), and in some cases the TSDB) to interact with a user's approved data device (mobile or otherwise) as well as other approved electronic hardware/devices and software/systems, and third parties through the TSDB. These third parties may include, but are not limited to, credit/debit card companies/issuers, banks, mobile apps, government credential-issuing organizations, etc. Moreover, the TIS can create ID/Credentials for users to be used by approved third parties. The TIS does not connect directly to any outside approved or non-approved parties/devices/databases/third parties, etc. Rather, any transaction connecting to TIS, TSS, and/or DSS must interface through the TSDB. This architecture prevents any direct public access to any data stored in the TIS. Thus, the disclosed novel system and method is designed to protect users from identity fraud and security vulnerabilities that are prevalent today and projected to continue to be common in the future.

All data for a user belongs to that user and the user themselves control the transmission of the data. The TIS and/or TSE system does not control the data dissemination, rather the TIS and/or TSE system assists the user to securely employ the user's data as the user directs.

Tango Secure Storage ("TSS")—In certain embodiments, the TSS, which is controlled by the TIS, is a secure data storage device or software module to protect user's information and allow the user and/or owner of the stored information to be the sole controllers of the stored information.

Data Secure Storage ("DSS")—In certain embodiments, the DSS, which is controlled by the TIS, is used separately or in conjunction with the TSS to securely store user/owner data.

Network Connection—In certain embodiments, processes such as, but not limited to, APIs (i.e., application program interfaces) and web services will be utilized from entities connecting to the TSE via a network connection. Requests and the extracted information will be sent to the TSE for processing and confirmation. Higher level authentication will require real-time connection with the TSE.

Firmware—In certain embodiments, entities not utilizing real-time connection and network connection will utilize firmware provided by the TSE Authority to fulfill processing and confirmation. The firmware will utilize stored procedures and Response Data provided by the TSE.

Provisioning

Provisioning, as used herein, includes the process of preparing and equipping an apparatus, such as, but not limited to, a secure storage system including a database, to allow the secure storage system to provide information and/or services to a user and/or third party.

The TSE Authority takes steps to provision data and entities. If the data has been successfully verified, it will be marked as so in the TSDB. The TSDB may still store unverified data and this unverified data will be utilized if a requester accepts unverified data.

In certain embodiments, the TSE provisions data in the following ways/scenarios:

Third Party Data Provisioning—In certain embodiments, the TSE will connect manually with third party entities to securely transfer or verify Actual Data. As a non-limiting example, two parties may swap IP addresses to create an exemption in the firewall to maintain connection for authentication of Actual Data.

Hardware Provisioning—In certain embodiments, the TSE creates profiles and Identifiers for unique hardware identification. Hardware from the TSE Authority may contain certificates and Identifiers in the hardware unit itself. Third party hardware such as mobile devices, computers, and terminals will require provisioning from the TSE to input Identifiers into the third party device by utilizing a Certificate Authority. As a non-limiting example, in order to provision a mobile device, the TSE will take in device-specific information from the third party device and create an Identifier/profile on the TSDB. Depending on the level of security needed, a Certificate Authority will input Identifier or Response Data to specific hardware to be utilized in future connections.

Third Party Provisioning Request—In certain embodiments, third party entities may issue a request to the TSE for a creation of an Identifier for a relationship between the TSE entity and the third party. In this instance, the TSE will create the third party specific Identifier and confirm with the entity if it wishes to attach this new Identifier to the entity's existing profile. If accepted, the information will be added to the entity's profile as verified data. If not, the information will be added to the entity's profile as unverified data. As a non-limiting example, a university wishes to create a unique Student ID for a particular TSE user when the user enrolls at the university. The TSE will create a new ID and ask the user if he/she wishes to attach the University Student ID into his/her profile.

User Provisioning Request—In certain embodiments, a user may issue a request to the TSE for creation and/or storage of a third party Identifier. This request may occur via a user device which extracts data from the third party and sends that data to the TSE or the request may consist of the user manually entering third party data and transferring that data to the TSE. If the TSE has a connection method with the third party for data verification, the data will be added to the user's profile as verified data. If not, the data will be added to the user's profile as unverified data. As a non-limiting example, if a user is utilizing an RFID/NFC ("radio frequency identification/near field communication") device, a user's mobile device may pick up passport data and send it to the TSE for storage for future mobile ID usage. As another non-limiting example, if a credit card company does not wish to do over-the-air provisioning of a credit or debit card, the credit card company may provide the user with an activation code. When the user manually enters the activation code with the TSE, e.g., on a TSE website, the activation code will be taken and verified with the credit card issuer and the TSE will provision the associated credit or debit card into the user's profile.

Third Party User Provisions—In certain embodiments, a user may provision a third party device utilizing TSE Identifiers and/or Response Data. This situation may occur via a user device which extracts data from the TSE and sends that data to a third party device. Alternatively, third party user provisioning may include the user manually entering TSE data that was previously inputted to a third party device. The third party device may or may not connect to the TSE for verification (pending security levels). The third party device, however, will maintain the data/credential for future authentication of the user. As a non-limiting example, a user may tap his/her mobile device against an input device (e.g., using NFC communication) when renting a locker. The user's Identifier is sent to the input device for the locker and stored. When the user wishes to open the locker once again, he/she may tap the mobile device again against the input device thus initiating a verification of the user's Identifier and, if verified, the locker opens. As another non-limiting example, a user enters his/her TSE username/password combination into a computer. The computer then connects with the TSE to verify the user's identity. Once the user' identity is confirmed, the TSE may download to the computer the user's specifications and files for use.

As stated above, provisioning includes the process of preparing and equipping an apparatus to allow it to provide service(s) (e.g., providing and/or verifying and/or authenticating IDs/credentials and/or the user or third parties) to its user. By way of explanation of the provisioning concept as disclosed herein, the following sections use and discuss simple terminology and scenarios. Those of skill in the art will readily understand that the terminology and/or the scenarios are exemplary only and in no way are intended to limit the scope of the disclosure or embodiments discussed.

For purposes of this discussion, the term "Giver" will be used to represent a User (i.e., person or entity for which ID/credential is created and/or stored and/or transmitted, as appropriate) or an apparatus utilized to pass data to a "Receiver", where the apparatus must have a network connection to a secure storage system for user to input and verify an ID/credential. Naturally, a user may have more than one apparatus that operates as a Giver. The term "Receiver" will be used to represent a network-enabled or localized apparatus which receives data from the Giver to validate Giver and/or provide appropriate service(s). The Receiver may have one or more Giver(s) accessed at the same time.

A Giver and Receiver relationship is utilized to describe a transaction of data that has or will take place. Due to the complexity of certain use cases of ID/credentials, there may be multiple transactions taking place in a particular use case. This may cause a user or apparatus to take on both the role of Giver and Receiver during portions of the entirety of a scenario.

Scenario A. Giver provisioning third party networked apparatus.
1. Giver connects with apparatus and passes data
2. Apparatus connects with Server (i.e., at secure storage sy1stem)
3. Server verifies data
4. Server (if data is validated) opens session
5. Server connects with apparatus to provide user with access to function allowed while session is open
6. Session can be closed by Server, User (Giver), or apparatus Scenario B. Giver provisioning third party networked Apparatus (when Apparatus lacks network connection or requires Giver to communicate with Server).
1. Giver connects with apparatus and passes data
2. Apparatus does not have network connection or requires Giver to communicate with Server
3. Apparatus connects with Giver (i.e., data device)
4. Giver connects with server
5. Server verifies data
6. Server (if data is validated) opens session
7. Server connects with Giver and passes session info
8. Giver connects with Apparatus to provide user with access to session
9. Session can be closed by Server, User, or Apparatus Scenario C. Giver network provisioning third party Apparatus.
1. Giver connects with Apparatus and passes data
2. Apparatus connects with Giver and passes data
3. Giver connects with Server
4. Server verifies data
5. Server (if data is validated) opens session
6. Server connects with Giver to provide user with access to function allowed while session is open
7. (optional step) Giver connects with Apparatus and passes data
8. Session can be closed by Server or Giver Scenario D. Giver provisioning 3rd party localized apparatus.
1. Giver connects with Apparatus and passes data
2. Apparatus analyze data and opens session with received data
3. Apparatus may store the data given by Giver as temporary data and open session, or
4. Apparatus may utilize permanent master data and open session (key)
5. Session can be closed by Giver or Apparatus A session can be closed, as non-limiting examples, by the User or User's device (whether they are the Giver or Receiver) in the following ways:
1. User can set a time to expire session based on time (clock time, elapsed time, etc.)
2. User can set an instance upon which the session will expire (e.g., key can only be used once)
3. User can manually close session A session can be closed by the Apparatus (Receiver) in the following ways, as non-limiting examples:
1. Apparatus can have a set time upon which the session will expire
2. Apparatus can have an instance upon which the session will expire (i.e. after one time use of function)
3. Apparatus can be manually closed (via a person with, e.g., a Master Override)

A session can be closed by the Server in the following ways, as non-limiting examples:
1. Server can have a set time upon which the session will expire
2. Server can have an instance upon which the session will expire (e.g., after two times of logging in to the Server)
3. Server can be manually closed (via a person with, e.g., a Master Override)

Examples of provisioning use cases are presented below. One of ordinary skill in the art will understand that these examples are offered to aid in understanding of the disclosure and do not limit the scope of the disclosure.

Example 1: User provisioning his/her own mobile device (Scenario A)
1. Giver connects with Apparatus and passes data
2. User enters username, password, PIN, email
3. Apparatus connects with Server
4. Apparatus sends username, password, PIN, email, Apparatus hardware ID, and Requesting Data
5. Server verifies data (TSDB sends request to TIS)
6. TIS verifies username, password, PIN, email, Apparatus hardware ID, Requesting Data, and opens session (if data is validated)
7. Server connects with Apparatus to provide User with access to function allowed while session is open
8. Server passes session token and User role data (i.e. accessible modules)
9. Session can be closed by Server, User, or Apparatus:
   a. Server expires session token based on time
   b. User manually closes session Example 2: User provisioning their door lock with network connection (Scenario A)
1. Giver connects with Apparatus and passes data
2. Giver passes User ID, Hardware ID, Data (PIN)
3. Apparatus connects with Server
4. Apparatus sends User ID, Hardware ID, Data (PIN), third party ID, App ID (firmware), Terminal ID, Requesting Data
5. Server verifies data (TSDB sends request to TIS)
6. TIS verifies User ID, Hardware ID, Data (PIN), third party ID, App ID (firmware), Terminal ID, Requesting Data and opens session (if data is validated)
7. Server connects with Apparatus to provide User with access to function allowed while session is open
8. Server passes session token and User role data (i.e. accessible modules)
9. Session can be closed by Server, User, or Apparatus:
   a. Server expires session token based on time
   b. User manually closes session
   c. Apparatus expires session token based on instance (when the door closes and door automatically locks)

Example 3: User provisioning a treadmill to contain workout detail (normally Scenario A), however, treadmill loses network connection in order to pull data therefore utilizes User's mobile device as a network relay (Scenario B).
1. Giver (User's mobile device) connects with Apparatus (treadmill) and passes data
2. Giver passes User ID, Hardware ID, Data (PIN)
3. Apparatus does not have network connection
4. Apparatus connects with Giver (device)
5. Treadmill passes User ID, Hardware ID, Data (PIN), third party ID, App ID (firmware), Terminal ID, Requesting Data to User's mobile device
6. Giver (device) connects with Server
7. User's mobile device passes User ID, Hardware ID, Data (PIN), third party ID, App ID (firmware), Terminal ID, Requesting Data to TSDB
8. Server verifies data (TSDB passes request to TIS)

9. TIS verifies User ID, Hardware ID, Data (PIN), third party ID, App ID (firmware), Terminal ID, Requesting Data and opens session (if data is validated)
10. Server connects with Giver (device) and passes session info
11. Server passes session token and data (i.e., workout details in this example)
12. Giver (device) connects with Apparatus to provide User with access to function/data (e.g., session token and workout details) allowed while session is open
13. Session can be closed by Server, User, or Apparatus:
    a. Server expires session token based on time
    b. User manually closes session
    c. Apparatus expires session token based on instance (when the machine is idle for 10 minutes)

Example 4: User goes to hotel where the hotel has the ability to provision the User's mobile device to be utilized as a key to enter into the User's room (Scenario C).
1. Giver (hotel computer) connects with Apparatus (user's mobile device) and passes data
2. Request Data (request for User ID, Hardware ID, Data, and optional credentials (input user name, password, PIN, etc.))
3. Apparatus connects with Giver and passes data
4. Giver passes User ID, Hardware ID, Data, and optional credentials
5. Giver connects with Server
6. Passes User ID, Hardware ID, Data, and optional credentials
7. Server verifies data
8. TSDB passes request to TIS
9. TIS verifies User ID, Hardware ID, Data, and optional credentials and opens session (if data is validated)
10. Server connects with Giver to provide User with access to function allowed while session is open
11. (Optional Step) Server connects with Giver (device) and passes session info
12. Server passes session token and data (i.e., door key)
13. Session can be closed by Server or Giver:
    a. Server expires session token based on time
    b. Giver manually closes session (Hotel can manually disable key)
    c. Apparatus expires session token based on instance (when User checks out of the room)

Example 5: User goes to a free public locker and provisions the locker for his/her use (Scenario D).
1. Giver connects with Receiver and passes data
2. Giver passes User ID, Hardware ID, data
3. Apparatus analyzes data and opens session with received data
4. Apparatus will utilize User ID, Hardware ID, data to open session and allow access in future if User ID, Hardware ID, data is given to verify
5. Session can be closed by Giver or Apparatus:
    a. Giver manually closes session (next time User opens and closes the locker)

Example 6: (This is an example where an apparatus may be both the giver and receiver and the entire process contains multiple provisioning processes) User has a home management system which controls temperature, TV channel settings, starting the bath water, and changing the security level.

Process A: User connects with Home Management System (Scenario A)
1. Giver (User's mobile device) connects with Apparatus and passes data
2. User enters User ID, Hardware ID, and data (PIN)
3. Apparatus (Home Management System) connects with Server
4. Apparatus sends User ID, Hardware ID, and data (PIN), App ID (firmware), Terminal ID, and Requesting Data
5. Server verifies data (TSDB sends request to TIS)
6. TIS verifies User ID, Hardware ID, and data (PIN), App ID (firmware), Terminal ID, and Requesting Data and opens session (if data is validated)
7. Server connects with Apparatus to provide User with access to function allowed while session is open
8. Server passes session token and User role data (i.e. accessible modules)
9. Session can be closed by Server, User, or Apparatus:
    a. User manually closes session (when exiting the premises)

Process B: Home Management System connects with all connected hardware to enter User's desired presets (Scenario D)
10. Giver (Home Management System) connects with Receiver (Home Climate Control) and passes data
11. Giver passes App ID (firmware), Terminal ID, data (climate preferences)
12. Receiver stores data and opens session with received data
13. Receiver sets the climate control in the house with the User's preset preferences
14. Session can be closed by Giver:
    a. Giver manually closes session (when Home Management System is notified by User in Process A, step 9)

Payment may be necessary as part of any provisioning process. The provisioning process which includes payment is the same as Scenario A or B where the data sent will include payment information. For the case where user data is sent from one mobile device to another mobile device, e.g., when a User gets a new device, the provisioning process will follow Scenario A where the data referenced in the provisioning process will include, for example, all information from the User's old mobile device. Where a User attempts to gain access to a gym via his/her membership card, the provisioning process follows Scenario A, where the open session will be for the instance of opening the door and session will be closed upon the door shutting. For the case where User A gives User B access to User A's door, this process is another example of a process which contains multiple provisioning methods. User A provisions User B by utilizing Scenario B to create a temporary key for User B. Then User B retrieves this key by following Scenario A. Once User B has the key, accessing the door utilizes the processes of Scenario D.

Payment Processing (with Additional Requests, i.e., PIN)

Certain processes will require additional information, such as a PIN request, in order to process the transaction. During these scenarios, additional steps are put in place for the Server to request the additional data either from the User directly (on the User's networked device) or to be entered on the Apparatus by the User.

Scenario E: Payment Processing on Terminal with PIN
1. Giver (User Mobile Device) connects with Receiver (Payment Terminal) and passes data1 including User ID, Hardware ID, Payment ID, and Requesting Data, to Receiver
2. Receiver passes data2 via network connection to Server, where data2 includes User ID, Hardware ID, Payment ID, and Requesting Data, 3rd Party ID, App ID (firmware), Terminal ID, and Requesting Data
3. Server verifies data2 (TSDB sends request to TIS)
4. TIS verifies data2, needs additional information (PIN)

Example 1: User (or Apparatus) is Purchasing an item through a terminal, such as a point-of-sale terminal. This purchase requires additional verification to be entered, but the terminal in this example does not have a input keypad, therefore User will need to enter PIN on his/her own mobile device.
5. Server requests additional data to Receiver, i.e., Requesting Data (Enter PIN)
6. Receiver requests additional data to Giver (mobile device)
7. User inputs data requested and Giver passes to Receiver
8. Receiver connects with Server
9. Server verifies data (TSDB sends request to TIS)
10. Server (if data is verified) opens session
11. Server connects with Receiver to provide Giver with access to function allowed while session is open
12. Session can only be closed by Server Example 2: User (or Apparatus) is Purchasing an Item Through a Terminal. This Purchase Requires Additional Verification to be Entered on the Terminal
5. Server requests additional data to Receiver, i.e., Requesting
Data (Enter PIN)
6. Receiver requests additional data to Giver
7. User inputs data requested on the Receiver
8. Receiver connects with Server
9. Server verifies data (TSDB sends request to TIS)
10. Server (if data is verified) opens session
11. Server connects with Receiver to provide Giver with access to function allowed while session is open
12. Session can only be closed by Server Payment Processing on Website (Mobile and/or Computer-based) with PIN Scenario F: Website will connect with Tango Secure Environment ("TSE") (application or portal)
1. Giver (Website) connects with Server and passes data: third party ID, App ID (firmware), User ID (e.g., username and password of User)
2. Server verifies data (TSDB sends request to TIS)
3. Server (if data is verified) opens session
4. Server connects with Receiver to provide Giver with access to function allowed while session is open
5. Giver (Website) connects with Receiver (TSE) and passes data: Session Token, Terminal ID, and data (item description, amount, etc.)

Scenario G: User will enter data on TSE (application or portal)
1. Giver (User) connects with Receiver (TSE) and passes data1: User ID, Hardware ID, Payment ID, and Requesting Data, to Receiver
2. Receiver passes data2 via network connection to Server: data1, third party ID, App ID (firmware), Terminal ID, and Requesting Data
3. Server verifies data2 (TSDB sends request to TIS)
4. TIS verifies data2, needs additional information (PIN)
5. Server sends request for additional data to Receiver: Requesting Data (Enter PIN)
6. Receiver requests additional data to Giver on TSE application or portal
7. User inputs data requested and data is passed to Receiver
8. Receiver connects with Server
9. Server verifies data (TSDB sends request to TIS)
10. Server (if data is verified) processes payment
11. Server connects with Receiver to provide Giver with confirmation
12. Session can only be closed by Server With attention drawn to FIG. 1, a block diagram of a secure data/credential storage system 100, the Tango Secure Environment ("TSE") according to an embodiment of the present subject matter is depicted. Shown are various segments of the TSE 100. Block 110 depicts the Tango Secure Database ("TSDB"). One of the functions of the TSDB 110 is to operate as the sole communication interface with all data devices communicating to/from the TSE 100. These data devices include, but are not limited to, mobile devices, websites, terminals, POS devices, electronic devices, mobile apps, computers, databases, network devices, etc. All information going to or coming from the TSE 100 must be routed through the TSDB 110. Block 120 depicts the Tango Intelligence System ("TIS") which, in an embodiment, comprises software. The TIS 120 has no direct public access. Access to the TIS 120 must be cleared and routed through the TSDB 110. Block 130 depicts the Tango Secure Storage ("TSS") which, in certain embodiments, is controlled by the TIS 120. The TSS 130 has no direct public access. Access to the TSS 130 must be cleared and routed through the TSDB 110. Block 140 depicts the Data Secure Storage ("DSS"). In an embodiment, the DSS 140 is an expandable secure storage facility for entities and users requiring secure storage and usage of data/ID/credential services, e.g., if a private secure cloud storage facility is requested. The DSS 140 has no direct public access. Access to the DSS 140 must be cleared and routed through the TSDB 110.

Figure 2:
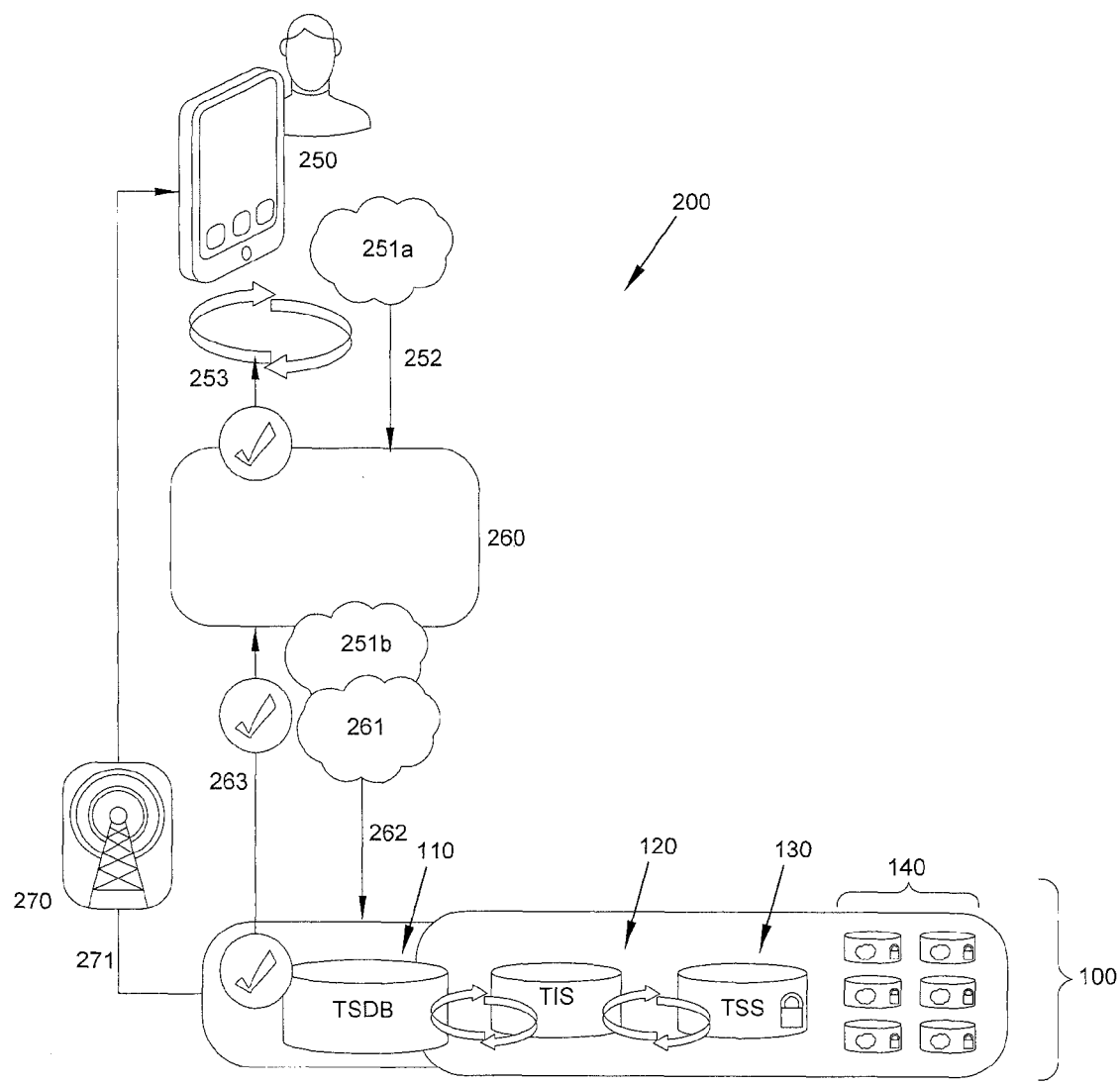
FIG. 2 is a functional block diagram of an ID/credential system illustrating a data/credential transmitting process according to an embodiment of the present subject matter.

Now turning to FIG. 2, a functional block diagram 200 is presented of an ID/credential system illustrating a data/credential transmitting process according to an embodiment of the present subject matter. In FIG. 2, the features designated 100, 110, 120, 130, and 140 are as described above with respect to FIG. 1. Depicted in FIG. 2 are a user's data device 250 and a third party data device 260, where either or both of these devices may be one of the data devices described above or any similar data device. In an embodiment discussed below, the user's data device 250 is referred to as mobile device 250 and the third party data device 260 is referred to as POS terminal 260. Those of skill in the art will readily understand that this exemplary embodiment is a non-limiting description of the workings of the novel system and method described herein. In an embodiment, the POS terminal 260 may be a payment gateway or other merchant device. The user in the presently-described embodiment has an account on the TSE 100 and therefore the user has an ID/credential known to the TSE, e.g. a User ID, and the mobile device 250 also has an ID, e.g., an application ID and/or a mobile ID, known to the TSE. The User ID, the application ID, and user-specific identifier data, such as data derived or tokenized from, e.g., at least one of the Identifiers discussed above, are portrayed in FIG. 2 as data 251a. In an embodiment, the User ID, the application ID, and the user-specific identifier data are conveyed to the POS terminal 260 in either derivative or tokenized form. The POS terminal 260 connects directly to the TSDB 110 via a connection that is wired, wireless, or both. In the presently-described embodiment, the POS terminal 260 is a device that is pre-provisioned with the TSE 100 such that the POS terminal includes ID information, such as a firmware ID and/or a terminal device ID and/or terminal hardware ID, all of which are known to the TSE. Additionally, the owner of the POS terminal 260 has a registration/account with the TSE 100 having an owner ID and therefore the owner of the POS terminal is also known to the TSE. Also depicted in FIG. 2 is a separate network connection 270 that typically is a wireless connection connecting the TSDB 110 to the mobile device 250.

To perform a transaction, the user conveys the data 251*a* from the mobile device 250 to the POS terminal 260 by any conventional means known in the art, such as, but not limited to, NFC, optics, infrared, radio, wireless network, scanning a bar code, etc. This data conveyance is shown in FIG. 2 as arrow 252. Upon receiving data 251*a*, the POS terminal 260 connects with the TSDB 110 and sends a request for a transaction and a request for data verification, as shown by arrow 262. In an embodiment, the POS terminal 260 connects with the TSDB 110 after the user enters a personal identification number (PIN) or similar code on the POS terminal 260 itself or on the mobile device 250 (if entered on the mobile device 250, the PIN may be transmitted wirelessly to the POS terminal 260). The PIN may be any numeric, alphanumeric, or other digital code, as understood in the art. The POS terminal 260 transmits the data 251*a* (which includes the PIN if entered on the mobile device 250) received from the mobile device 250 as data 251*b* (which includes the PIN whether entered on the mobile device 250 as discussed above or entered on the POS terminal 260), as well as data 261 which includes, for example, the POS terminal's firmware ID, the POS terminal's hardware ID, the POS terminal's owner ID, and a transaction ID which includes information regarding the type of transaction (e.g., a purchase transaction or an account settings update) requested of the TSDB 110.

The TSDB 110 passes the information received from the POS terminal 260 to the TIS 120 which authenticates that data 251*b* and data 261 are authorized. In an embodiment, the User ID, the application ID, and user-specific identifier data in data 251*b* are authenticated and the POS terminal's firmware ID, the POS terminal's hardware ID, and the POS terminal's owner ID in data 261 are authenticated, and the transaction ID in data 261 is verified and approved. In an embodiment, the verification and approval of the transaction is based at least in part on the stored profile for the POS terminal's owner (accessed by the POS terminal's owner ID). In a further embodiment, the PIN is authenticated based on the User ID. Additionally, the TSDB 110 may store any incoming data from data 251*b* and data 261 such as, but not limited to, any data required to complete the requested transaction (e.g., payment information, account numbers, date, etc.) For example, the user may be prompted to enter an input to authorize the transaction. Alternatively, the TIS 120 may cause the data required to complete the requested transaction to be stored in the TSS 130 or DSS 140. If required by the type of transaction and/or in response to instructions from the user and/or the POS terminal owner (either stored in the TSE 100 prior to the transaction request or sent to the TSDB 110 during the transaction request as, for example, part of data 251*a* and/or 251*b*), the TIS 120, via the TSDB 110, contacts the mobile device 250 via the network connection 270 (shown as arrow 271) to verify the user's authorization for the requested transaction. Alternatively, the TIS 120, via the TSDB 110, contacts the mobile device 250 via the POS terminal 260 which then interacts with the mobile device 250. In an embodiment, the user receives the verification request on the mobile device 250, enters a reply into the mobile device 250 such as, but not limited to, a PIN, a password, a code, or other manually-entered authorization, and sends that authorization from the mobile device 250 to the TSDB 110 via the network connection 270 (shown by arrow 271). The TSDB 110 then passes this information to the TIS 120.

Once the TIS 120 receives the above-mentioned data and authorizations and authenticates and approves the transaction, the TIS retrieves any additional stored data necessary for the transaction from the TSS 120 and/or the DSS 140. The TIS 120 then sends (shown as arrow 263) information necessary to complete the requested transaction, via the TSDB 110, to the POS terminal 120 and/or the mobile device 250 (shown as arrow 253). In an embodiment, the TSDB 110 stores some or all of the following transaction data: the User ID, the application ID, the user-specific identifier data, the POS terminal's firmware ID, the POS terminal's hardware ID, the POS terminal's owner ID, and the transaction ID.

Figure 3:
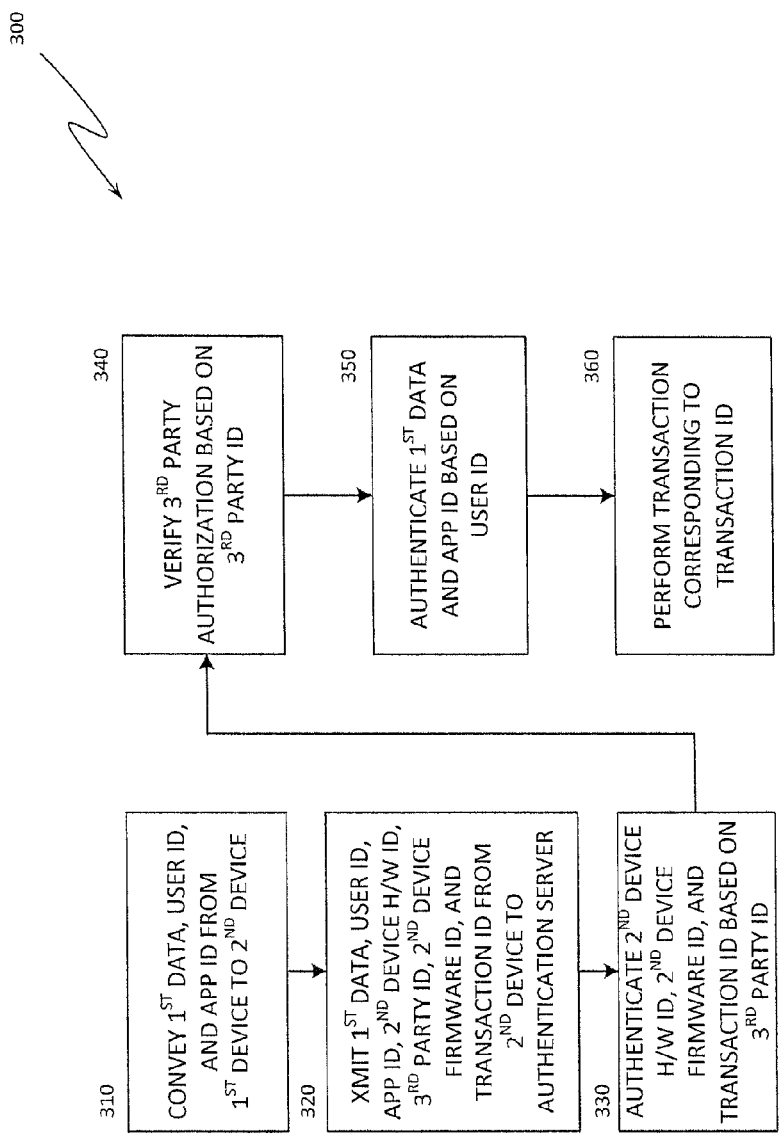
FIG. 3 is a flow chart for a secure data/credential storage process according to an embodiment of the present subject matter.

FIG. 3 illustrates a flow chart 300 for a secure data/credential storage process according to an embodiment of the present subject matter. At block 310, first data, a user identifier (e.g., the User ID), and an application identifier (e.g., the application ID) are conveyed from a first device to a second device. In an embodiment, the first data is the user-specific identifier data discussed above, the first device is the user's data device 250 discussed above, and the second device is the third party data device 260 discussed above. In an embodiment, the first data is produced as a result of processing confidential data of the user and the User ID with a hash function. In another embodiment, the first data is produced as a result of processing confidential data of the user with a hash function. Also, the conveying is by any conventional means known in the art, such as, but not limited to, NFC, optics, infrared, radio, wireless network, scanning a bar code, etc. At block 320, the third party data device 260 transmits to an authentication server, such as the TSE 100 via the TSDB 110, the first data, the User ID, the application ID, a second device hardware identifier, a third party identifier where the third party is the owner of the third party device 260, a second device firmware identifier, and a transaction type identifier corresponding to a requested transaction type. In an embodiment, the application identifier is based on a unique identifier of the first device, a software identifier corresponding to software running on the first device, and an authentication identifier.

At block 330, at a computer processor of the authentication server, such as TIS 120, the second device hardware identifier and the second device firmware identifier are authenticated based on the third party identifier.

At block 340, the process includes verifying, at a computer processor of the authentication server, such as TIS 120, based on the third party identifier, that the third party owner of the third party device 260 is authorized to perform the requested transaction type for the user. At block 350, the first data and application identifier are authenticated based on the user identifier. At block 360, the transaction for the user corresponding to the requested transaction type which is associated with the transaction type identifier, is performed.

Figure 4:
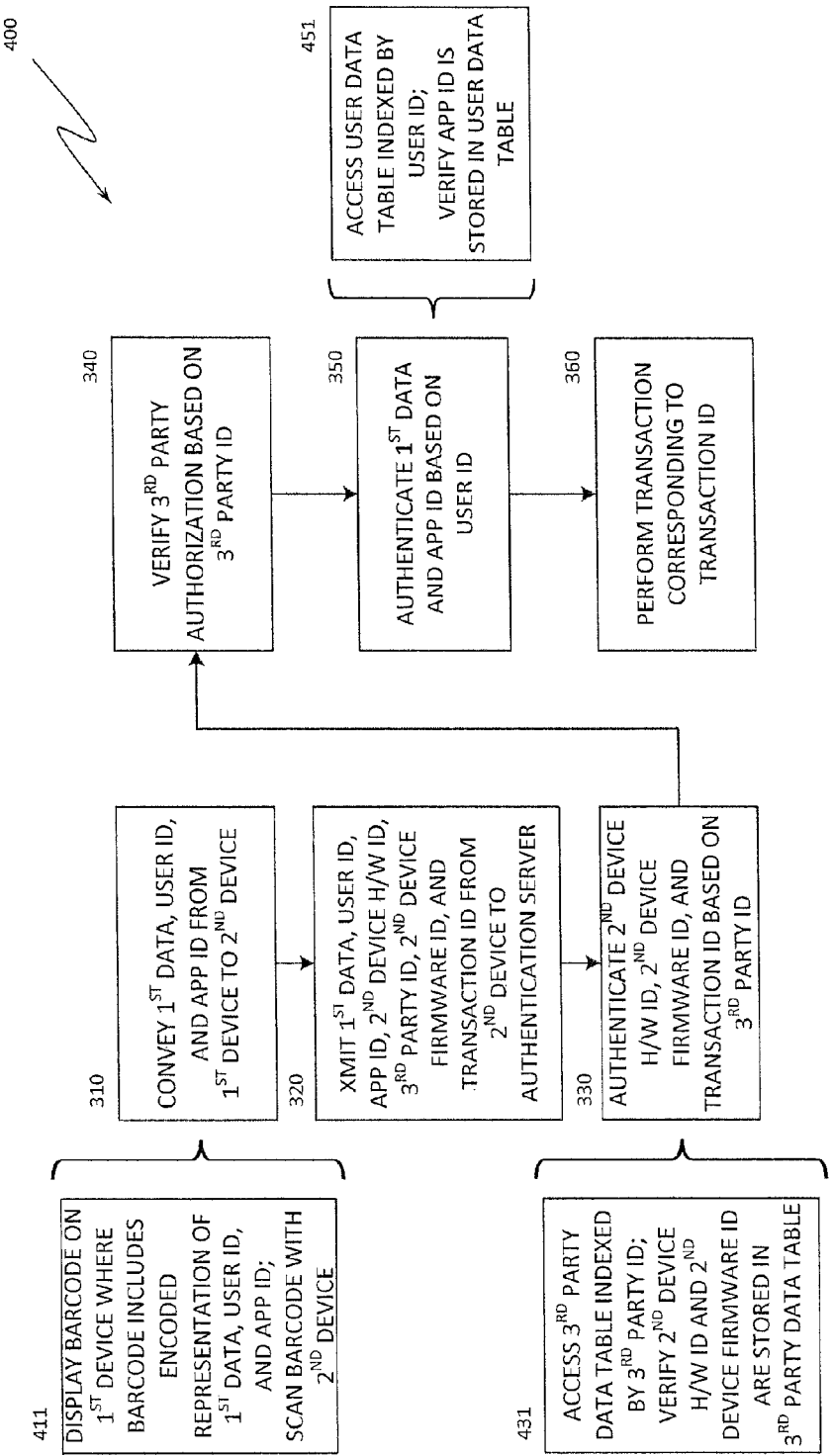
FIG. 4 is a flow chart for a secure data/credential storage process according to another embodiment of the present subject matter.

Considering FIG. 4, a flow chart 400 is presented for a secure data/credential storage process according to another embodiment of the present subject matter. In FIG. 4, blocks 310, 320, 330, 340, 350, and 360 are the same as the corresponding blocks discussed above with respect to FIG. 3. At block 411, the conveying of the first data, the user identifier, and the application identifier in block 310 includes displaying a barcode on the first device, where the barcode includes an encoded representation of the first data, the user identifier, and the application identifier, and scanning the barcode with the second device. At block 431, the authenticating of the second device hardware identifier and the second device firmware identifier based on the third party identifier in block 330 includes accessing a third party data table in the TSE 100 (e.g., in the TSDB 110, TSS 120, and/or DSS 130) indexed by the third party identifier, and verifying that the second device hardware identifier and the second device firmware identifier are stored in the third party data table. At block 451, the authenticating of the first data and the application identifier based on the user identifier in block 350 includes accessing a user data table in the TSE 100 (e.g., in the TSDB 110, TSS 120, and/or DSS 130) indexed by the user identifier, and verifying that the application identifier is stored in the user data table.

Figure 5:
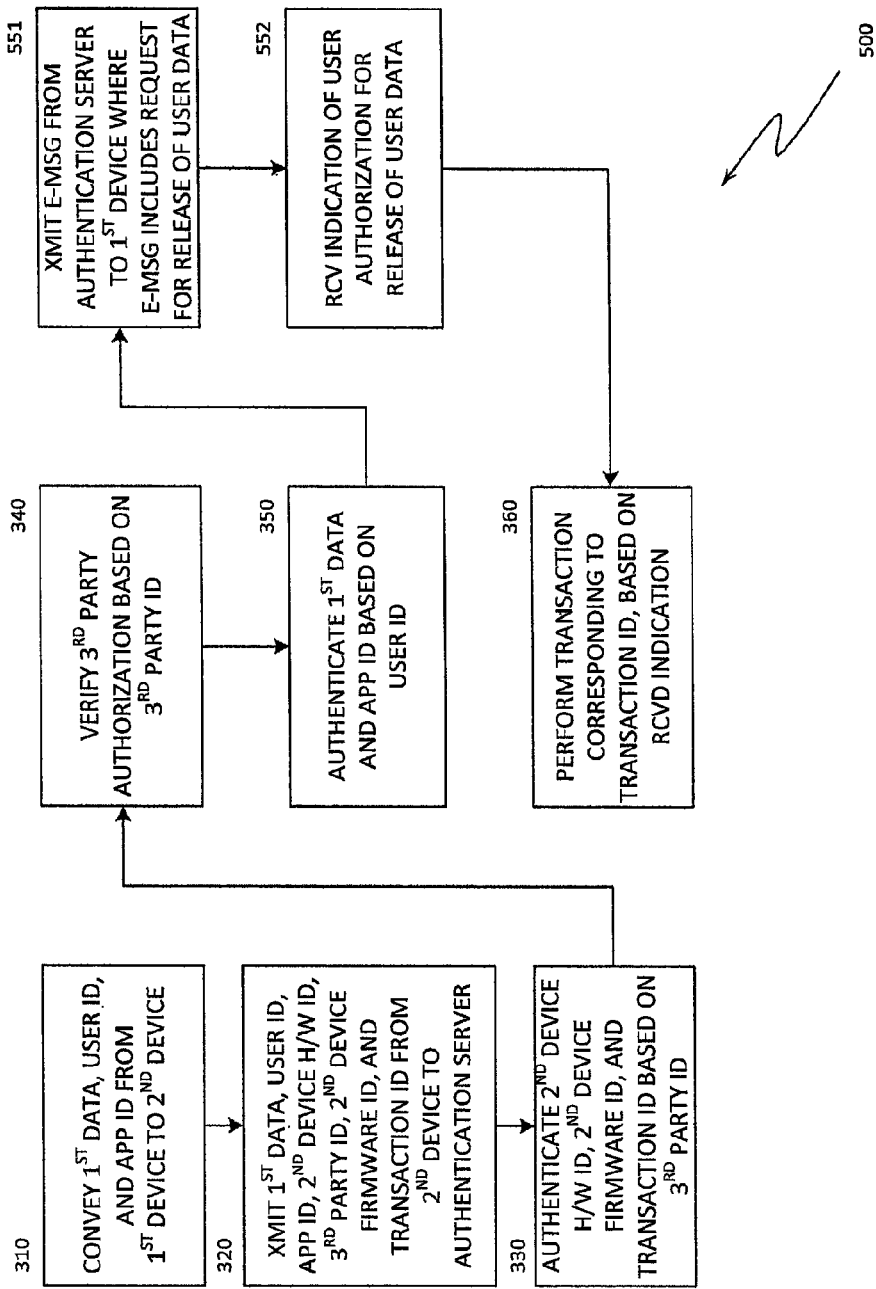
FIG. 5 is a flow chart for a secure data/credential storage process including contacting a user device according to yet another embodiment of the present subject matter.

Now considering FIG. 5, a flow chart 500 is shown for a secure data/credential storage process including contacting a user device according to yet another embodiment of the present subject matter. In FIG. 5, blocks 310, 320, 330, 340, 350, and 360 are the same as the corresponding blocks discussed above with respect to FIG. 3. However, after the first data and the application identifier are authenticated at block 350, at block 551 an electronic message is wirelessly transmitted from the authentication server to the first device (each as described above), where the electronic message includes a request for user authorization of a release of user data associated with the transaction. At block 552, the authentication server receives an indication of user authorization of the release of the user data associated with the transaction and then, at block 360, the transaction is performed for the user based on the received indication of user authorization of the release of the user data.

Figure 6:
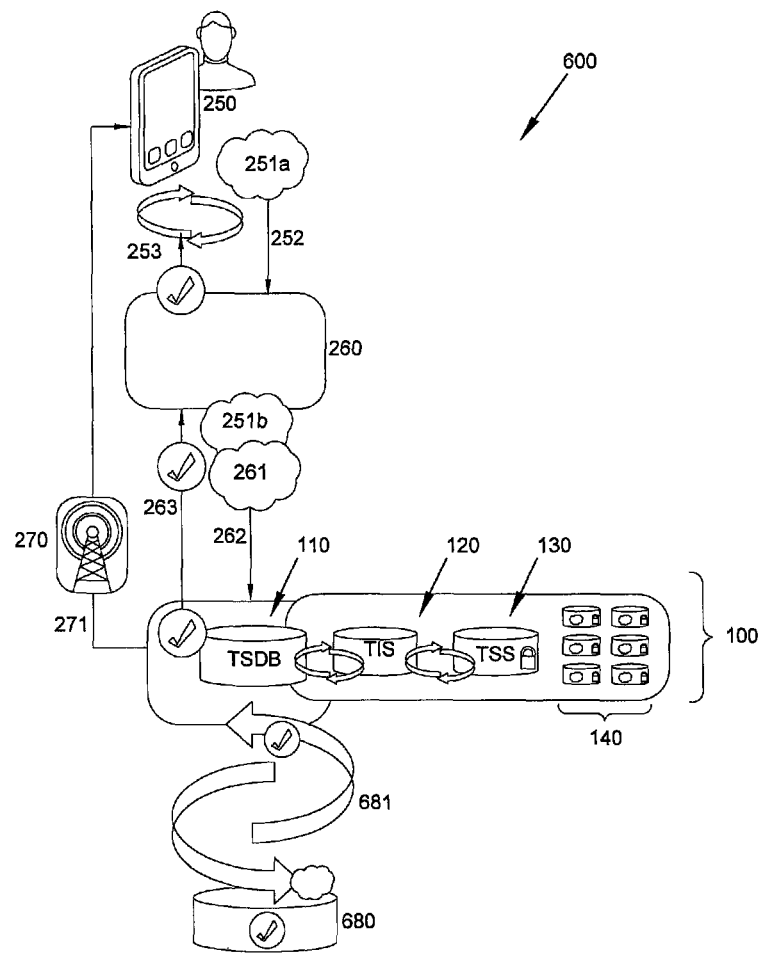
FIG. 6 is a functional block diagram of an ID/credential system illustrating a data/credential transmitting process and requesting data from an entity according to another embodiment of the present subject matter.

FIG. 6 shows a functional block diagram 600 of an ID/credential system illustrating a data/credential transmitting process and requesting data from an entity according to another embodiment of the present subject matter. In FIG. 6, the features designated 100, 110, 120, 130, 140, 250, 251*a*, 251*b*, 252, 253, 260, 261, 262, 263, 270, and 271 are as described above with respect to FIGS. 1 and 2, as appropriate. Additionally, FIG. 6 includes an outside entity 680 which includes a computer, microprocessor, or some similar electronic data device. Communications between the TSE 100 and the outside entity 680, indicated by arrow 681, occur via the TSDB 110.

As described above with respect to FIG. 2, once the TIS 120 receives the described data and authorizations, and the TIS 120 authenticates and approves the transaction, the TIS retrieves any additional stored data necessary for the transaction from the TSS 120 and/or the DSS 140. In the embodiment depicted in FIG. 6, the TIS 120 requires additional data retrieval and/or approval from the outside entity 680 in order to complete the requested transaction. Therefore, the TIS 120, via the TSDB 110, communicates with the outside entity 680 (as shown by arrow 681) in order to collect/store data and/or retrieve/store procedures and/or obtain approval and/or inform the outside entity of the requested transaction (if so required by the type of transaction associated with the transaction ID). Examples of the foregoing include, but are not limited to, message retrieval/delivery, alert notification, collect/store update data regarding the user and/or owner of the POS terminal and/or another party that has an interest in the requested transaction. Once the TIS 120 has fulfilled the necessary obligations with respect to the outside entity 680, the TIS 120, as discussed above with respect to FIG. 2, then sends (shown as arrow 263) information necessary to complete the requested transaction, via the TSDB 110, to the POS terminal 120 and/or the mobile device 250 (shown as arrow 253). In an embodiment, the TSDB 110 stores some or all of the following transaction data: the User ID, the application ID, the user-specific identifier data, the POS terminal's firmware ID, the POS terminal's hardware ID, the POS terminal's owner ID, and the transaction ID.

Figure 7:
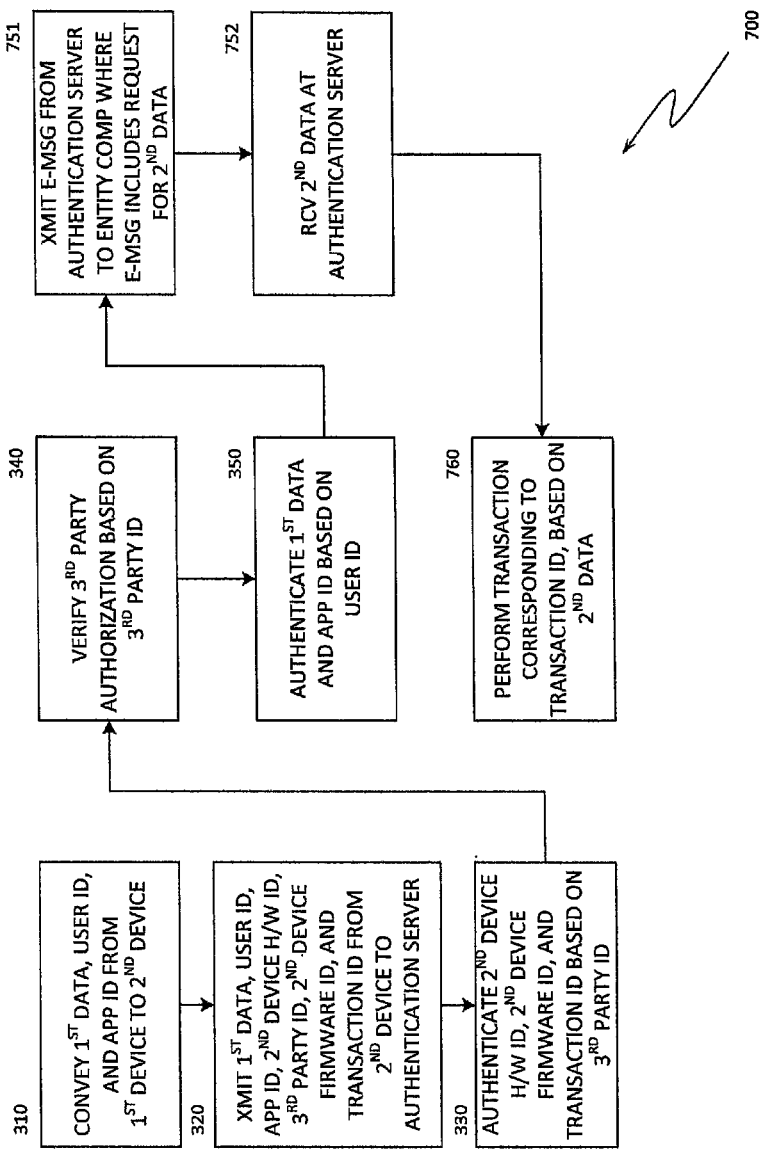
FIG. 7 is a flow chart for a secure data/credential storage process including requesting data from an entity related to a transaction according to still another embodiment of the present subject matter.

FIG. 7 depicts a flow chart 700 for a secure data/credential storage process including requesting data from an entity related to a transaction according to still another embodiment of the present subject matter. In FIG. 7, blocks 310, 320, 330, 340, and 350 are the same as the corresponding blocks discussed above with respect to FIG. 3. However, after the first data and the application identifier are authenticated at block 350, at block 751 an electronic message is transmitted from the authentication server (e.g., TIS 120 in FIG. 6) to an entity computer of an entity (e.g., outside entity 680 in FIG. 6), where the electronic message includes a request for a second set of data, where the second set of data may include, but is not limited to, stored data and/or stored procedures located at the outside entity 680, and/or approval of the transaction from the outside entity 680, etc. At block 752 the TIS 120 receives the second data from the outside entity computer and, at block 760, the requested transaction is performed for the user based on the second set of data.

Figure 8:
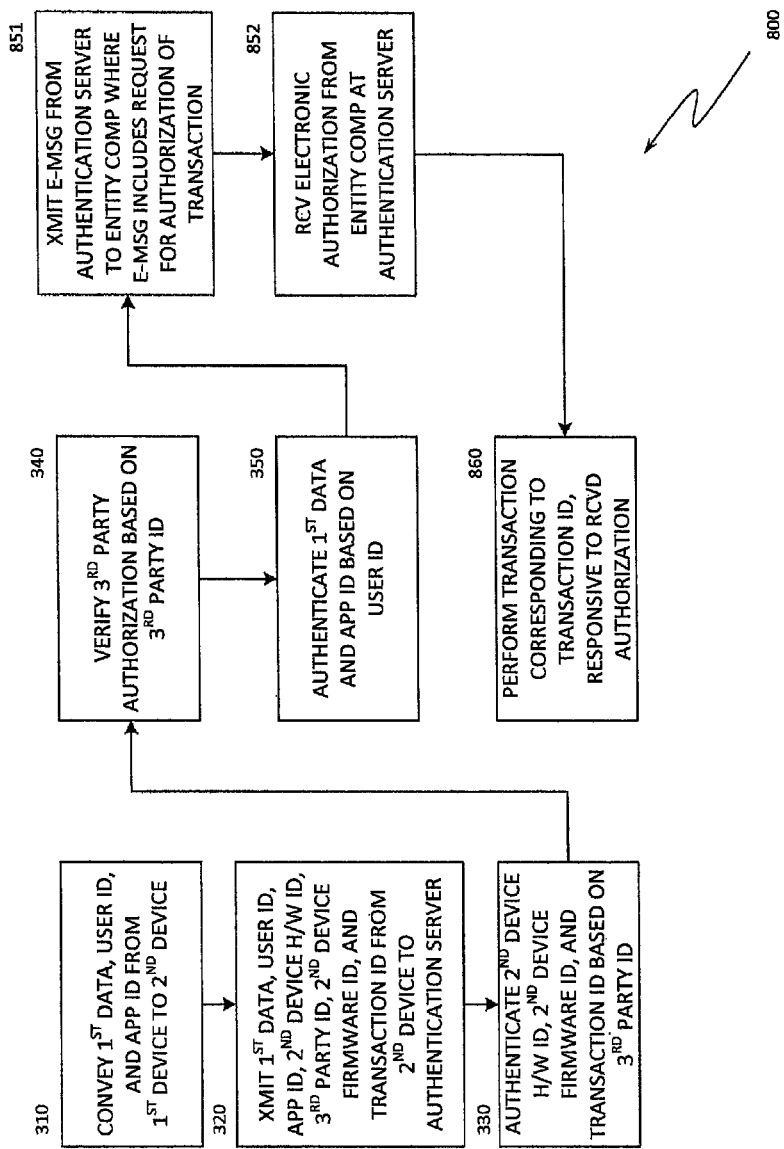
FIG. 8 is a flow chart for a secure data/credential storage process including requesting approval from an entity according to yet still another embodiment of the present subject matter.

With attention now drawn to FIG. 8, a flow chart 800 is presented for a secure data/credential storage process including requesting approval from an entity according to yet still another embodiment of the present subject matter. In FIG. 8, blocks 310, 320, 330, 340, and 350 are the same as the corresponding blocks discussed above with respect to FIG. 3. However, after the first data and the application identifier are authenticated at block 350, at block 851 an electronic message is transmitted from the authentication server (e.g., TIS 120 in FIG. 6) to an entity computer of an entity (e.g., outside entity 680 in FIG. 6), where the electronic message includes a request for authorization of the requested transaction. At block 852, an electronic authorization from the entity computer is received at the authentication server. At block 860, the requested transaction is performed for the user responsive to the received authorization from the entity computer.

Figure 9:
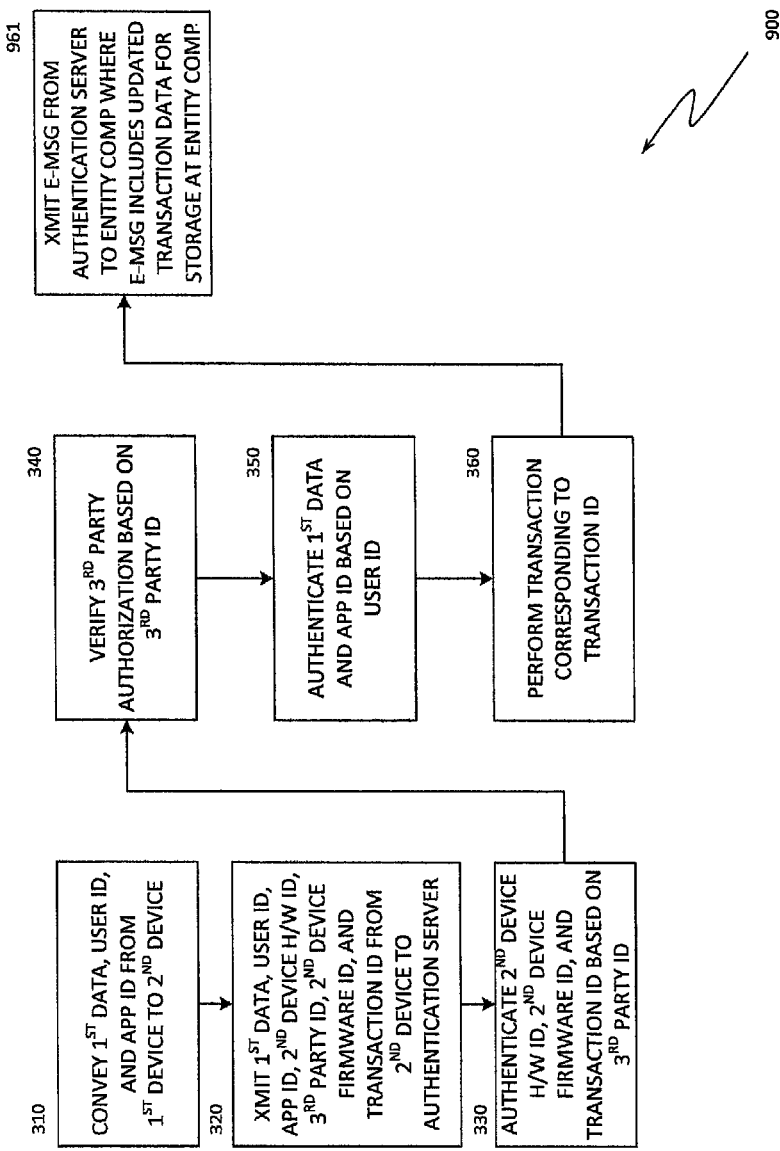
FIG. 9 is a flow chart for a secure data/credential storage process including updating an entity regarding a transaction according to a further embodiment of the present subject matter.

FIG. 9 illustrates a flow chart 900 for a secure data/credential storage process including updating an entity regarding a transaction according to a further embodiment of the present subject matter. In FIG. 9, blocks 310, 320, 330, 340, 350, and 360 are the same as the corresponding blocks discussed above with respect to FIG. 3. After the requested transaction is performed at block 360, at block 961 an electronic message is transmitted from the authentication server (e.g., TIS 120 in FIG. 6) to an entity computer of an entity (e.g., outside entity 680 in FIG. 6), where the electronic message includes updated transaction data for storage at the entity computer.

Figure 10:
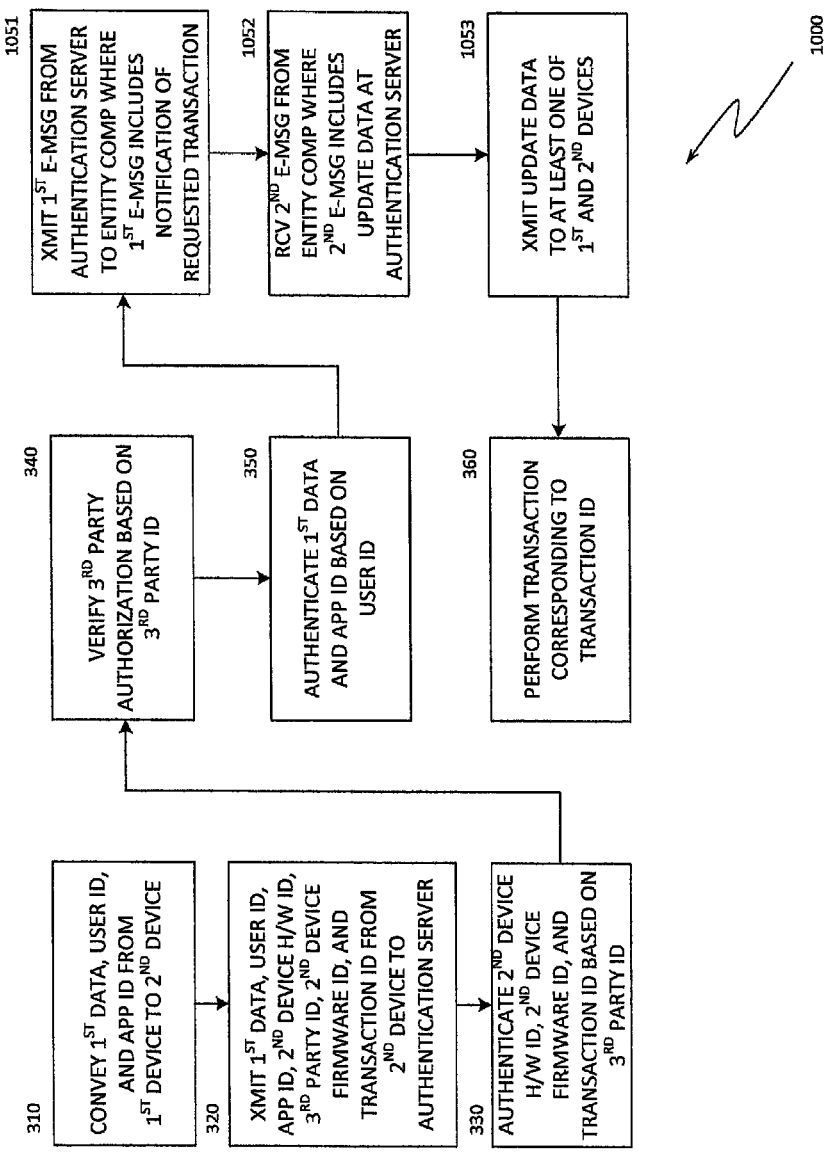
FIG. 10 is a flow chart for a secure data/credential storage process including receiving information from an entity regarding a transaction according to yet a further embodiment of the present subject matter.

FIG. 10 portrays a flow chart 1000 for a secure data/credential storage process including receiving information from an entity regarding a transaction according to yet a further embodiment of the present subject matter. In FIG. 10, blocks 310, 320, 330, 340, 350, and 360 are the same as the corresponding blocks discussed above with respect to FIG. 3. However, after the first data and the application identifier are authenticated at block 350, at block 1051 a first electronic message is transmitted from the authentication server (e.g., TSI 120 in FIG. 6) to an entity computer of an entity (e.g., outside entity 680 in FIG. 6), where the first electronic message includes a notification of the requested transaction. At block 1052, a second electronic message is received at the authentication server from the entity computer, where the second electronic message includes update data. The update data may include, for example, any updated information relevant to the user, the third party, or the transaction. At block 1053, the update data is transmitted to at least one of the first and second devices (e.g., the user's data device 250 and a third party data device 260 in FIG. 2). At block 360, the transaction for the user corresponding to the requested transaction type which is associated with the transaction type identifier, is performed, as discussed above with respect to FIG. 3.

Figure 11:
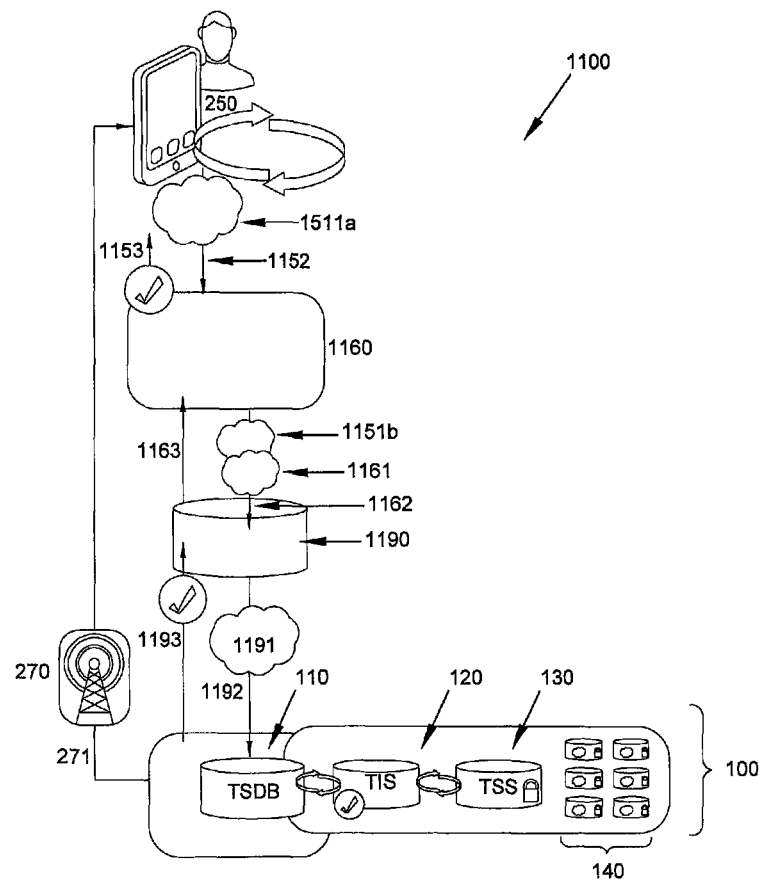
FIG. 11 is a functional block diagram of an ID/credential system illustrating a data/credential transmitting process using a non-authenticated device according to yet another embodiment of the present subject matter.

FIG. 11 represents a functional block diagram 1100 of an ID/credential system illustrating a data/credential transmitting process using a non-authenticated device according to yet another embodiment of the present subject matter. In FIG.

11, the features designated 100, 110, 120, 130, 140, 250, 270, and 271 are as described above with respect to FIGS. 1 and 2, as appropriate. Additionally, FIG. 11 includes third party data device 1160 and interchange 1190. The interchange 1190 may be, for example, a payment processor, a gift card processor, a merchant processor, a bank processor, an acquiring bank processor, computer network, or a database.

In the presently-described embodiment, the third party data device 1160 differs from the POS terminal 260 in FIG. 2 in that the third party data device 1160 is a device that is not manufactured to interface with the TSE 100 and thus the owner of the third party data device 1160 may not have a registration/account with the TSE 100 and may not have an owner ID and therefore the owner of the third party data device 1160 may not be known to the TSE. However, the interchange 1190 has the capability to recognize if a transaction request is a Tango transaction (as opposed to, e.g., a conventional credit card transaction or gift card transaction that the interchange is configured to process) due to the presence of the Tango ID. In an embodiment, the third party data device 1160 is modified to include firmware to interface with the TSE 100. The third party data device 1160 includes ID information, such as a firmware ID and/or a terminal device ID and/or terminal hardware ID and/or third party ID, all of which are known to the TSE.

In the presently-described embodiment, the User ID, the application ID, and user-specific identifier data, such as data derived or tokenized from, e.g., at least one of the Identifiers discussed above, are portrayed in FIG. 11 as data 1151a. In an embodiment, the User ID, the application ID, and the user-specific identifier data are conveyed to the third party data device 1160 in either derivative or tokenized form. Also included in the data 1151a is a specific predetermined code (sometimes referred to herein as a "Tango ID") which identifies a user's transaction (i.e., a "Tango transaction") as being of a type that requires processing by the TSE 100. The Tango ID may be a stand-alone ID, it may be input by the user via the mobile device 250, or it may be embedded in at least one of the User ID, the application ID, or the user-specific identifier data.

To perform a transaction, the user conveys the data 1151a from the mobile device 250 to the third party data device 1160 by any conventional means known in the art, such as, but not limited to, NFC, optics, infrared, radio, wireless network, scanning a bar code, etc. This data conveyance is shown in FIG. 11 as arrow 1152. In an embodiment, the third party data device 1160 connects with the interchange 1190 after the user enters a PIN or similar code on the third party data device 1160 or on the mobile device 250.

Upon receiving data 1151a (which includes the PIN if entered on the mobile device 250), the third party data device 1160 connects with the interchange 1190. The third party data device 1160 transmits the data 1151a received from the mobile device 250 as data 1151b (which includes the PIN if entered on either the third party data device 1160 or the mobile device 250 as discussed above), as well as data 1161 which includes, for example, the third party data device's firmware ID, the third party data device's hardware ID, the third party data device's owner ID, and a transaction ID which includes information regarding the type of transaction requested. This data transmission is shown in FIG. 11 as arrow 1162.

The interchange 1190 receives the data 1151b and data 1161 and recognizes the transaction request as a Tango transaction (as opposed to, e.g., a conventional credit card transaction or gift card transaction that the interchange is configured to process) due to the presence of the Tango ID. The interchange 1190 then routes the data 1151b and data 1161, represented together as data 1191, to the TSDB 110 (which includes a request for a transaction and a request for data verification). This data transmission is shown in FIG. 11 as arrow 1192.

The TSDB 110 passes the information received from the interchange 1190 to the TIS 120 which authenticates that data 1151b and data 1161 are authorized. In an embodiment, the User ID, the application ID, and user-specific identifier data in data 1151b are authenticated and the third party data device's firmware ID, the third party data device's hardware ID, and the third party data device's owner ID in data 1161 are authenticated, and the transaction ID in data 1161 is verified and approved. In an embodiment, the verification and approval of the transaction is based at least in part on the stored profile for the third party data device's owner (accessed by the third party data device's owner ID). Additionally, the TSDB 110 may store any incoming data from data 1151b and data 1161 such as, but not limited to, any data required to complete the requested transaction (e.g., payment information, account numbers, date, etc.) Alternatively, the TIS 120 may cause the data required to complete the requested transaction to be stored in the TSS 130 or DSS 140. If required by the type of transaction and/or in response to instructions from the user and/or the third party data device's owner (either stored in the TSE 100 prior to the transaction request or sent to the TSDB 110 during the transaction request as, for example, part of data 1151a and/or 1151b), the TIS 120, via the TSDB 110, contacts the mobile device 250 via the network connection 270 (shown as arrow 271) to verify the user's authorization for the requested transaction. Alternatively, the TIS 120, via the TSDB 110, contacts the mobile device 250 via the interchange 1190 and the third party data device 1160 which then interacts with the mobile device 250. In an embodiment, the user receives the verification request on the mobile device 250, enters a reply into the mobile device 250 such as, but not limited to, a PIN, a password, a code, or other manually-entered authorization, and sends that authorization from the mobile device 250 to the TSDB 110 via the network connection 270 (shown by arrow 271). The TSDB 110 then passes this information to the TIS 120.

Once the TIS 120 receives the above-mentioned data and authorizations and authenticates and approves the transaction, the TIS retrieves any additional stored data necessary for the transaction from the TSS 120 and/or the DSS 140. The TIS 120 then sends information necessary to complete the requested transaction, via the TSDB 110, to the interchange 1190 (arrow 1193) which sends it on to the third party data device 1160 (arrow 1163) which sends it on to the mobile device 250 (arrow 1153). In an embodiment, the TSDB 110 stores some or all of the following transaction data: the User ID, the application ID, the user-specific identifier data, the third party data device firmware ID, the third party data device hardware ID, the third party data device owner ID, and the transaction ID.

Figure 12:
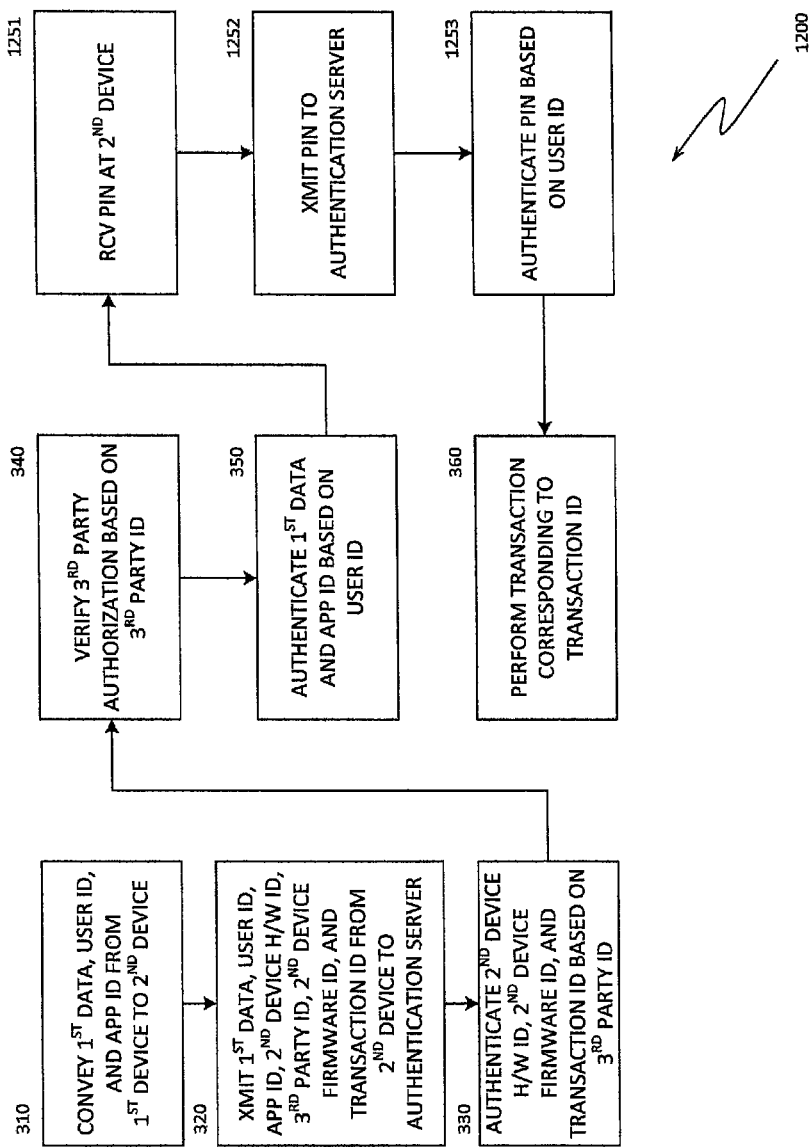
FIG. 12 is a flow chart for a secure data/credential storage process including using a PIN according to still a further embodiment of the present subject matter.

FIG. 12 illustrates a flow chart 1200 for a secure data/credential storage process including using a PIN according to still a further embodiment of the present subject matter. In FIG. 12, blocks 310, 320, 330, 340, 350, and 360 are the same as the corresponding blocks discussed above with respect to FIG. 3. However, after the first data and the application identifier are authenticated at block 350, at block 1251 a PIN is received at the second device, e.g., the third party data device 260 in FIG. 2. At block 1252 the PIN is transmitted from the second device to the authentication server (e.g., TIS 120 in FIG. 2) which, at block 1253, authenticates the PIN based on the User ID, as discussed above. At block 360, the transaction for the user corresponding to the requested transaction type which is associated with the transaction type identifier, is performed, as discussed above with respect to FIG. 3.

Figure 13:
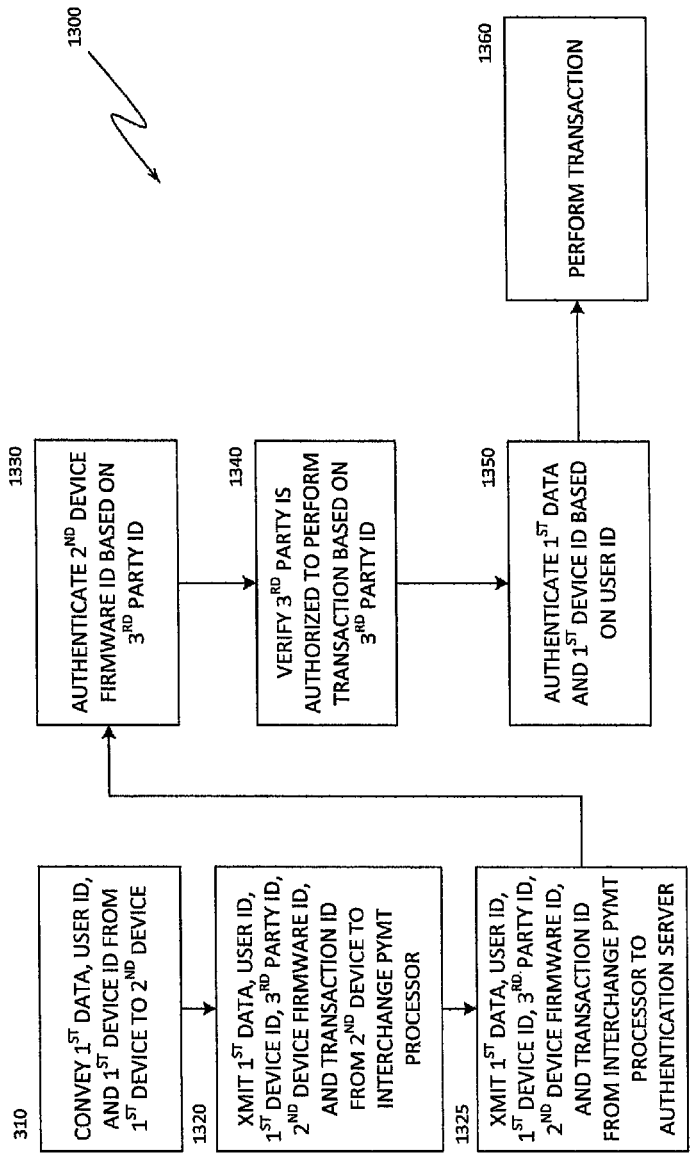
FIG. 13 is a flow chart of an ID/credential transmitting process using a non-authenticated device according to yet still a further embodiment of the present subject matter.

FIG. 13 depicts a flow chart 1300 of an ID/credential transmitting process using a non-authenticated device according to yet still a further embodiment of the present subject matter. In FIG. 13, block 310 is the same as the corresponding block discussed above with respect to FIG. 3 and, in the presently-discussed embodiment, the first device corresponds to the mobile device 250 in FIG. 2 and the second device corresponds to the third party data device 1160 in FIG. 11. At block 1320, the third party data device 1160 transmits to an interchange payment processor, such as the interchange 1190 in FIG. 11, the first data, the User ID, the application ID (and/or first device ID), a third party identifier where the third party is the owner of the third party data device 1160, the second device firmware identifier, and a transaction type identifier corresponding to a requested transaction type. In an embodiment, the application identifier is based on a unique identifier of the first device, a software identifier corresponding to software running on the first device, and an authentication identifier.

At block 1325, the interchange 1190 transmits to an authentication server, such as TSE 100 via the TSDB 110 in FIG. 1, the first data, the User ID, the application ID (and/or first device ID), a third party identifier, the second device firmware identifier, and a transaction type identifier corresponding to a requested transaction type. At block 1330, at a computer processor of the authentication server, such as TIS 120 in FIG. 1, the second device hardware identifier and the second device firmware identifier are authenticated based on the third party identifier. At block 1340, the process includes verifying, at a computer processor of the authentication server, such as TIS 120, based on the third party identifier, that the third party owner of the third party device 260 is authorized to perform the requested transaction type for the user.

At block 1350, the first data and the first device ID (and/or the application ID) are authenticated based on the user identifier. At block 1360, the transaction for the user corresponding to the requested transaction type which is associated with the transaction type identifier, is performed.

Figure 14:
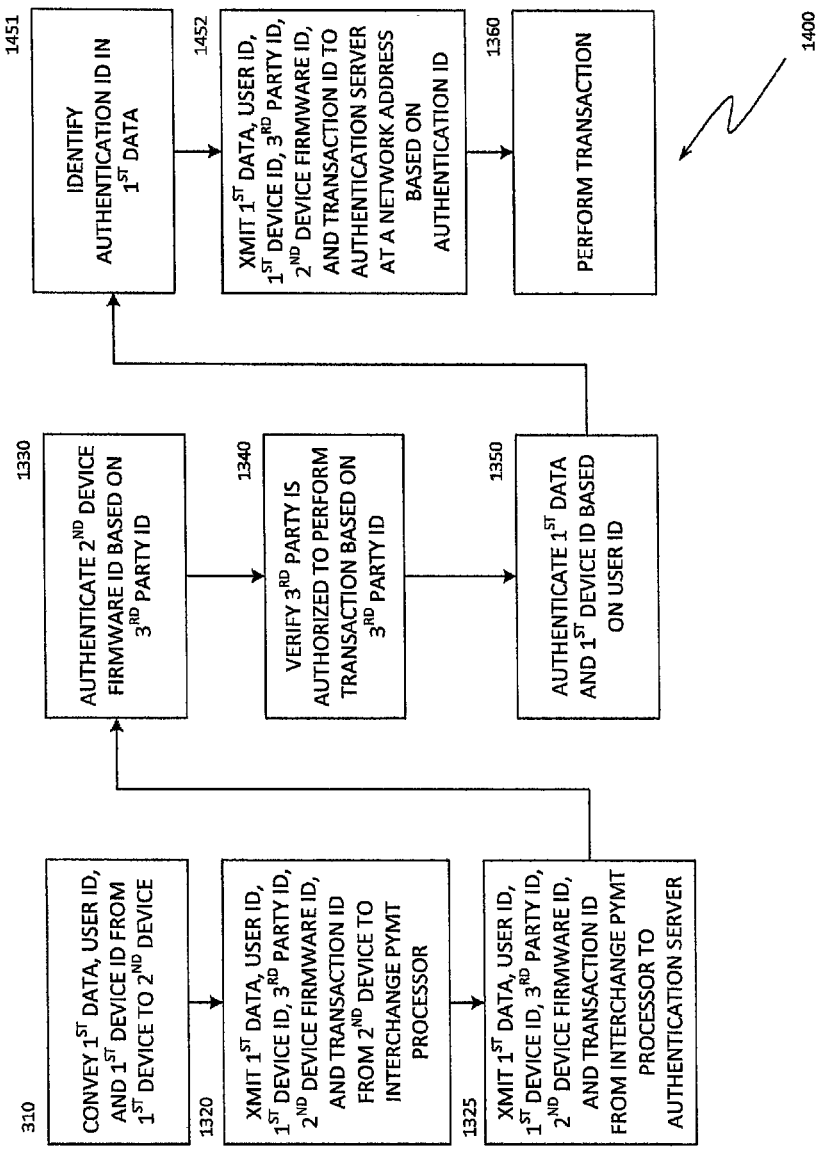
FIG. 14 is a flow chart of an ID/credential transmitting process using a non-authenticated device with a user ID embedded in data according to an even further embodiment of the present subject matter.

FIG. 14 shows a flow chart 1400 of an ID/credential transmitting process using a non-authenticated device with a user ID embedded in data according to yet an even further embodiment of the present subject matter. In FIG. 14, block 310 is the same as described above with respect to FIG. 13 with the addition that the first data includes an authentication identifier. Also in FIG. 14, blocks 1320, 1325, 1330, 1340, and 1350 are the same as the corresponding blocks discussed above with respect to FIG. 13. However, after the first data and the first device ID are authenticated at block 1350, at block 1451 the authentication identifier in the first data is identified at the interchange payment processor. At block 1452, the first data, the user identifier, the first device identifier, the third party identifier, the second device firmware identifier, and the transaction type identifier are transmitted to the authentication server at a network address (e.g., IP address) based on the authentication identifier. At block 1360, the transaction for the user corresponding to the requested transaction type which is associated with the transaction type identifier, is performed, as discussed above.

Figure 15:
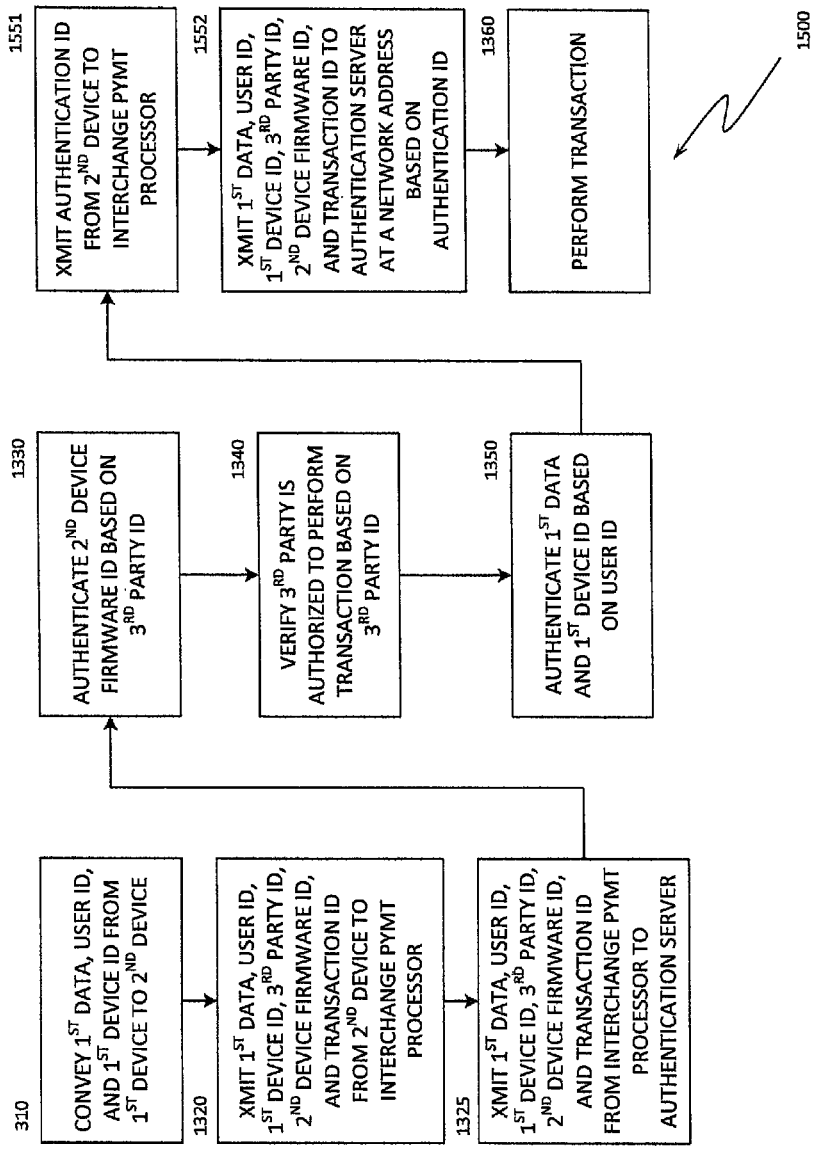
FIG. 15 is a flow chart of an ID/credential transmitting process using a non-authenticated device with a stand-alone user ID according to yet an even further embodiment of the present subject matter.

FIG. 15 describes a flow chart 1500 of an ID/credential transmitting process using a non-authenticated device with a stand-alone user ID according to yet an even further embodiment of the present subject matter. In FIG. 15, blocks 310, 1320, 1325, 1330, 1340, and 1350 are the same as the corresponding blocks discussed above with respect to FIG. 13.

However, after the first data and the first device ID are authenticated at block 1350, at block 1551 an authentication identifier is transmitted from the second device to the interchange payment processor. In an embodiment, the authentication identifier is transmitted from the first device to the second device prior to being transmitted from the second device to the interchange payment processor. At block 1452, the first data, the user identifier, the first device identifier, the third party identifier, the second device firmware identifier, and the transaction type identifier are transmitted to the authentication server at a network location (e.g., specified by an IP address) based on the authentication identifier. At block 1360, the transaction for the user corresponding to the requested transaction type which is associated with the transaction type identifier, is performed, as discussed above.

Figure 16:
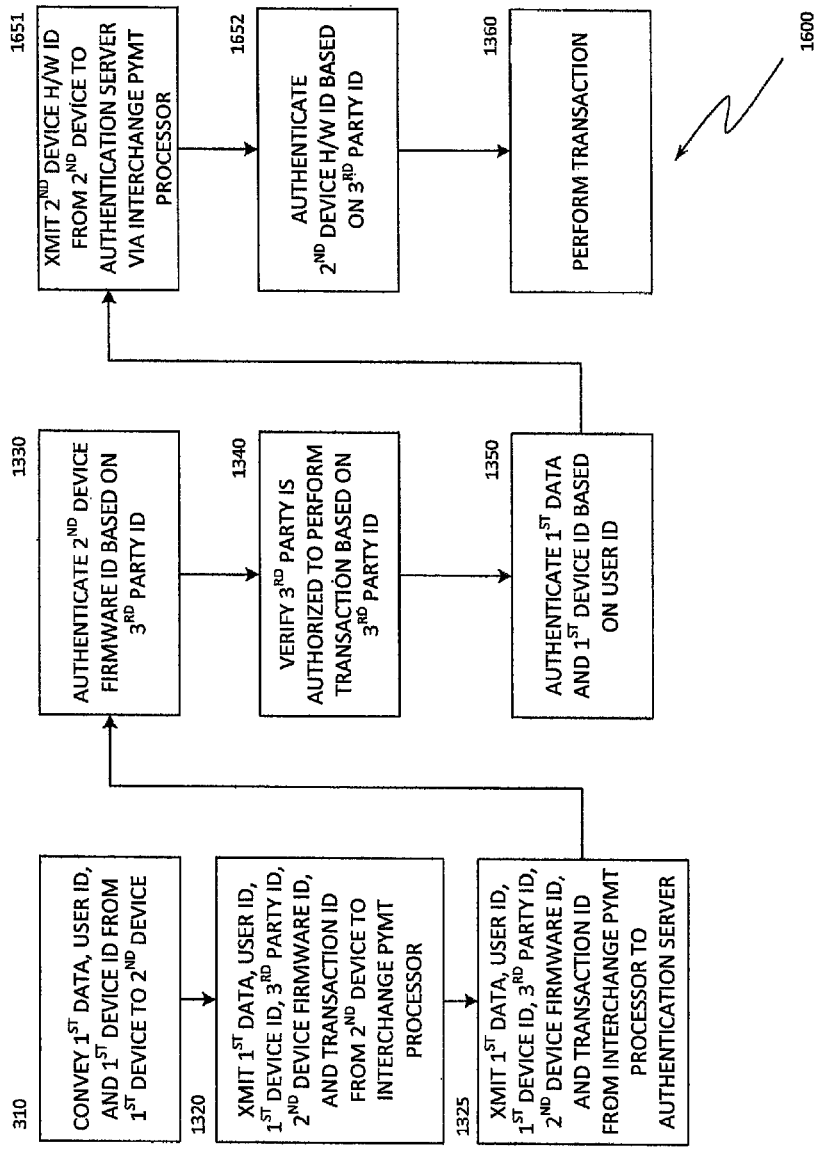
FIG. 16 is a flow chart of an ID/credential transmitting process using a non-authenticated device with terminal ID authentication according to still an even further embodiment of the present subject matter.

FIG. 16 is a representation of a flow chart 1600 of an ID/credential transmitting process using a non-authenticated device with terminal ID authentication according to still an even further embodiment of the present subject matter. In FIG. 16, blocks 310, 1320, 1325, 1330, 1340, and 1350 are the same as the corresponding blocks discussed above with respect to FIG. 13. However, after the first data and the first device ID are authenticated at block 1350, at block 1651 a second device hardware identifier is transmitted from the second device to the authentication server via the interchange payment processor. At block 1652, the second device hardware identifier is authenticated based on the third party identifier. At block 1360, the transaction for the user corresponding to the requested transaction type which is associated with the transaction type identifier, is performed, as discussed above.

Figure 17:
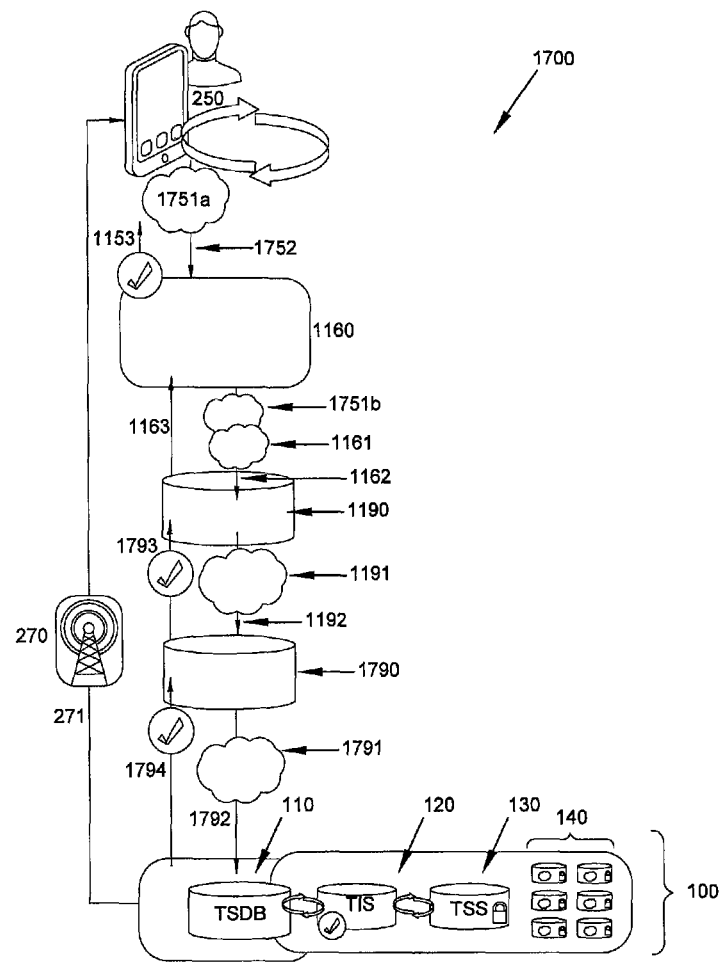
FIG. 17 is a functional block diagram of an ID/credential system illustrating a data/credential transmitting process using a first interchange device according to yet still another embodiment of the present subject matter.

FIG. 17 represents a functional block diagram 1700 of an ID/credential system illustrating a data/credential transmitting process using a first interchange device according to yet still another embodiment of the present subject matter. In FIG. 17, the features designated 100, 110, 120, 130, 140, 250, 270, and 271 are as described above with respect to FIGS. 1 and 2, as appropriate. Additionally, FIG. 17 includes third party data device 1160 and interchange 1190 as described above with respect to FIG. 11. Also in FIG. 17, the features designated 1153, 1161, 1162, and 1163 are as described above with respect to FIG. 11. Furthermore, FIG. 17 also includes interchange 1790 which, in a particular embodiment, is a credit card and/or debit card interchange and/or a bank interchange. In another embodiment, interchange 1790 may be a credit card association/interchange or a network and/or database associated with a credit card association. For the discussion of the embodiment presented below, interchange 1790 will be referred to as credit card interchange 1790.

To perform a transaction, the user conveys the data 1751a from the mobile device 250 to the third party data device 1160 by any conventional means known in the art, such as, but not limited to, NFC, optics, infrared, radio, wireless network, scanning a bar code, etc. This data conveyance is shown in FIG. 17 as arrow 1752. In the presently-described embodiment, the data 1751a includes a credit card number, a user ID (as described above), and a first device ID (i.e., the hardware ID and/or application ID for the mobile device 250). In an embodiment, the third party data device 1160 connects with the interchange 1190 after the user enters a PIN or similar code on the third party data device 1160 or on the mobile device 250.

Upon receiving data 1751a (which includes the PIN if entered on the mobile device 250), the third party data device 1160 connects with the interchange 1190. The third party data device 1160 transmits the data 1751a received from the mobile device 250 as data 1751*b* (which includes the PIN if entered on either the third party data device 1160 or the mobile device 250 as discussed above), as well as data 1161 which includes, for example, the third party data device's firmware ID and/or the third party data device's hardware ID, the third party data device's owner ID, and a transaction ID which includes information regarding the type of transaction requested. This data transmission is shown in FIG. 17 as arrow 1162.

The interchange 1190 receives the data 1151*b* and data 1161 and processes the data and recognizes therefrom that the transaction request is a credit card transaction due to the presence and verification of the credit card number. The interchange 1190 then routes the data 1151*b* and data 1161, represented together as data 1191, to the credit card interchange 1790. This data transmission is shown in FIG. 17 as arrow 1192.

At the credit card interchange 1790, an authentication ID is determined from the credit card number, as is known in the art. From the credit card number in the received data 1191, the credit card interchange 1790 recognizes that the credit card transaction is a Tango transaction and then transmits received data 1191 as data 1791 to the TSDB 110 (as discussed above in other embodiments, the information/data received by the TSDB will include a request for a transaction and a request for data verification). This data transmission is shown in FIG. 17 as arrow 1792.

The TSDB 110 passes the information received from the credit card interchange 1790 to the TIS 120 which authenticates that data 1791 (i.e., 1751*b* and data 1161) are authorized. In an embodiment, the User ID, the application ID, and user-specific identifier data in data 1751*b* are authenticated and the third party data device's firmware ID, the third party data device's hardware ID, and the third party data device's owner ID in data 1791 are authenticated, and the transaction ID in data 1161 is verified and approved. In an embodiment, the verification and approval of the transaction is based at least in part on the stored profile for the third party data device's owner (accessed by the third party data device's owner ID). Additionally, the TSDB 110 may store any incoming data from data 1751*b* and data 1161 such as, but not limited to, any data required to complete the requested transaction (e.g., payment information, account numbers, date, etc.) Alternatively, the TIS 120 may cause the data required to complete the requested transaction to be stored in the TSS 130 or DSS 140.

If required by the type of transaction and/or in response to instructions from the user and/or the third party data device's owner (either stored in the TSE 100 prior to the transaction request or sent to the TSDB 110 during the transaction request as, for example, part of data 1751*a* and/or 1751*b*), the TIS 120, via the TSDB 110, contacts the mobile device 250 via the network connection 270 (shown as arrow 271) to verify the user's authorization for the requested transaction. Alternatively, the TIS 120, via the TSDB 110, contacts the mobile device 250 via the credit card interchange 1790 (arrow 1794), interchange 1190 (arrow 1793), and the third party data device 1160 (arrow 1163) which then interacts with the mobile device 250 (arrow 1153). In an embodiment, the user receives the verification request on the mobile device 250, enters a reply into the mobile device 250 such as, but not limited to, a PIN, a password, a code, or other manually-entered authorization and sends that authorization from the mobile device 250 to the TSDB 110 via the network connection 270 (shown by arrow 271). The TSDB 110 then passes this information to the TIS 120.

Once the TIS 120 receives the above-mentioned data and authorizations and authenticates and approves the transaction, the TIS retrieves any additional stored data necessary for the transaction from the TSS 120 and/or the DSS 140. The TIS 120 then sends information necessary to complete the requested transaction, via the TSDB 110, to the credit card interchange 1790 (arrow 1794) which sends it on to interchange 1190 (arrow 1793) which sends it on to the third party data device 1160 (arrow 1163) which sends it on to the mobile device 250 (arrow 1153). In an embodiment, the TSDB 110 stores some or all of the following transaction data: the User ID, the application ID, the credit card data, the third party data device firmware ID, the third party data device hardware ID, the third party data device owner ID, and the transaction ID.

Figure 18:
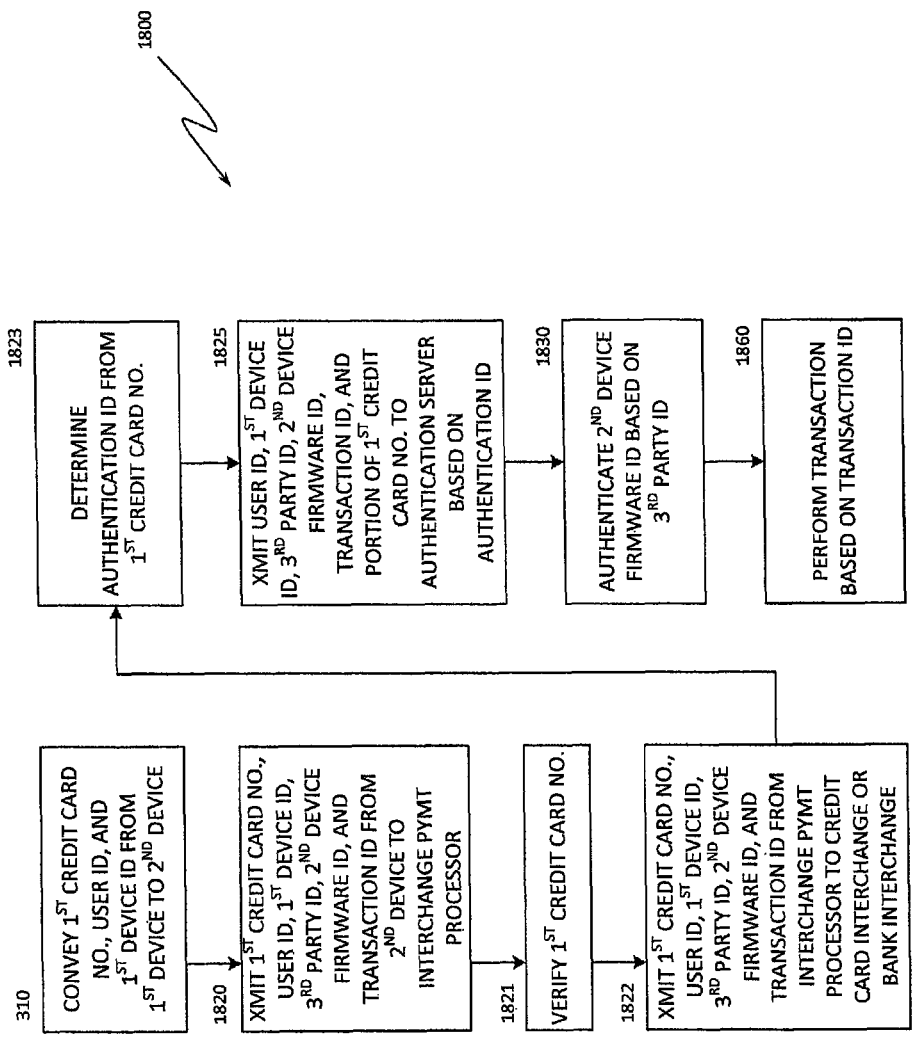
FIG. 18 is a flow chart of an ID/credential transmitting process using a first interchange device according to yet still an even further embodiment of the present subject matter.

FIG. 18 depicts a flow chart 1800 of an ID/credential transmitting process using a first interchange device according to yet still an even further embodiment of the present subject matter. In FIG. 18, block 310 is the same as the corresponding block discussed above with respect to FIG. 13. At block 310, a first credit card number, a user identifier, and a first device identifier is wirelessly conveyed from a first device to a second device (e.g., the third party data device 1160 in FIG. 17), where the user identifier is unique to the user.

At block 1820, the first credit card number, the user identifier, the first device identifier, a third party identifier (e.g., the owner of the third party data device 1160 in FIG. 17), a second device firmware identifier, and a transaction type identifier corresponding to the user's requested transaction type, are transmitted from the second device to an interchange payment processor (e.g., the interchange 1190 in FIG. 17). At block 1821, the first credit card number is verified at the interchange payment processor. In an embodiment, verifying the first credit card number includes determining an issuer identifier, where the issuer identifier is associated with an issuer bank for the credit card number. Additionally, as discussed below, the credit card interchange or bank interchange is a bank interchange associated with an issuer bank identified by the issuer identifier.

At block 1822, the first credit card number, the user identifier, the first device identifier, the third party identifier, the second device firmware identifier, and the transaction type identifier are transmitted from the interchange payment processor to either a credit card interchange or a bank interchange (e.g., the interchange 1790 in FIG. 17). At block 1823, an authentication identifier from the first credit card number is determined at the interchange 1790.

At block 1825, the user identifier, the first device identifier, the third party identifier, the second device firmware identifier, the transaction type identifier, and at least a portion of the first credit card number are transmitted to an authentication server (e.g., the TSE 100 via the TSDB 110 in FIG. 17) specified by the authentication identifier. At block 1830, at a computer processor of the authentication server (e.g., TIS 120 in FIG. 17) the second device firmware identifier is authenticated based on the third party identifier. At block 1860, a transaction is performed for the user corresponding to the requested transaction type.

Figure 19:
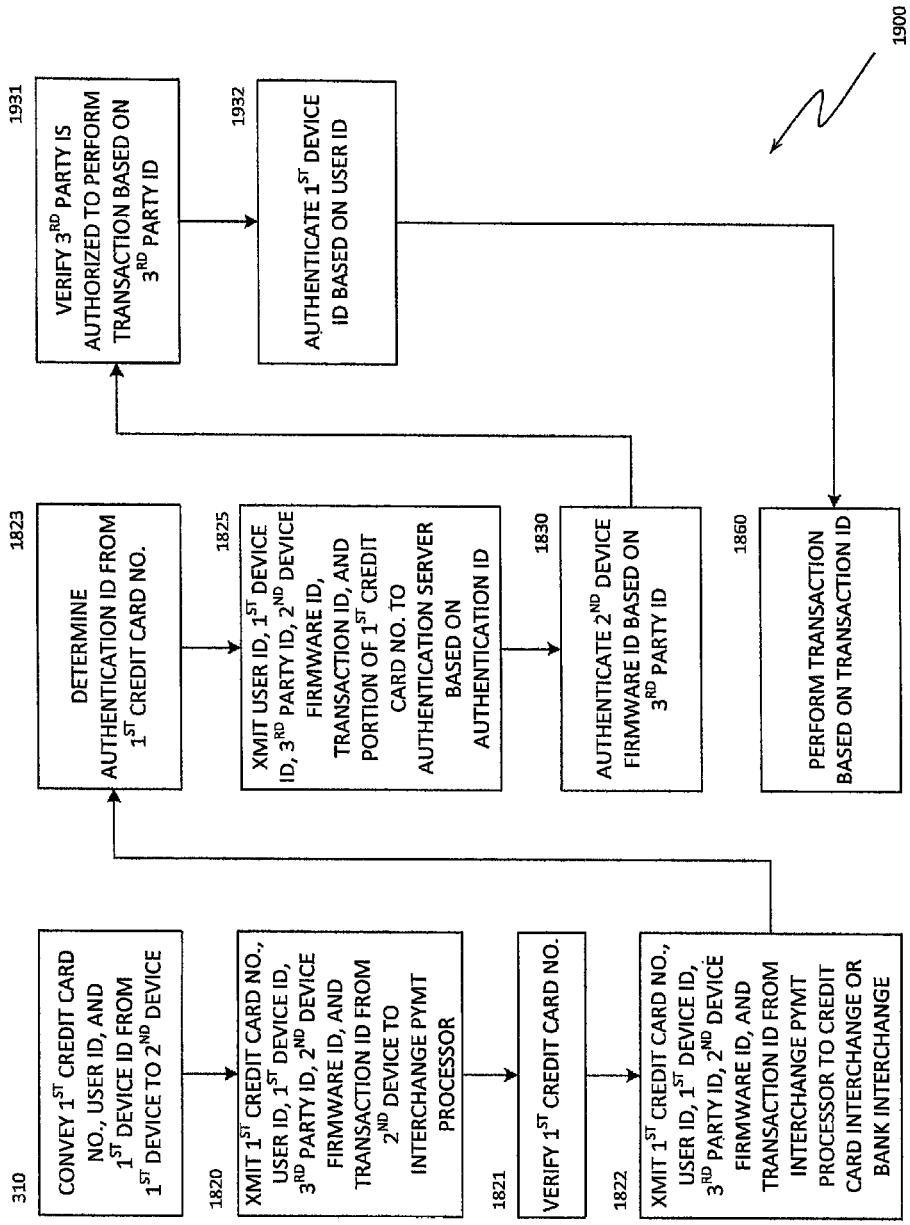
FIG. 19 is a flow chart of an ID/credential transmitting process using a first interchange device and authentication according to another embodiment of the present subject matter.

FIG. 19 presents a flow chart 1900 of an ID/credential transmitting process using a first interchange device and authentication according to another embodiment of the present subject matter. In FIG. 19, blocks 310, 1820, 1821, 1822, 1823, 1825, 1830, and 1860 are the same as the corresponding blocks discussed above with respect to FIG. 18. However, after the second device firmware identifier is authenticated based on the third party identifier in block 1830, at block 1931 a verification is made to determine that a third party is authorized to perform the requested transaction type for the user, where the verifying is based on the third party identifier. At block 1932, the first device identifier is authenticated based on the user identifier. Then, at block 1860, a transaction is performed for the user corresponding to the requested transaction type.

Figure 20:
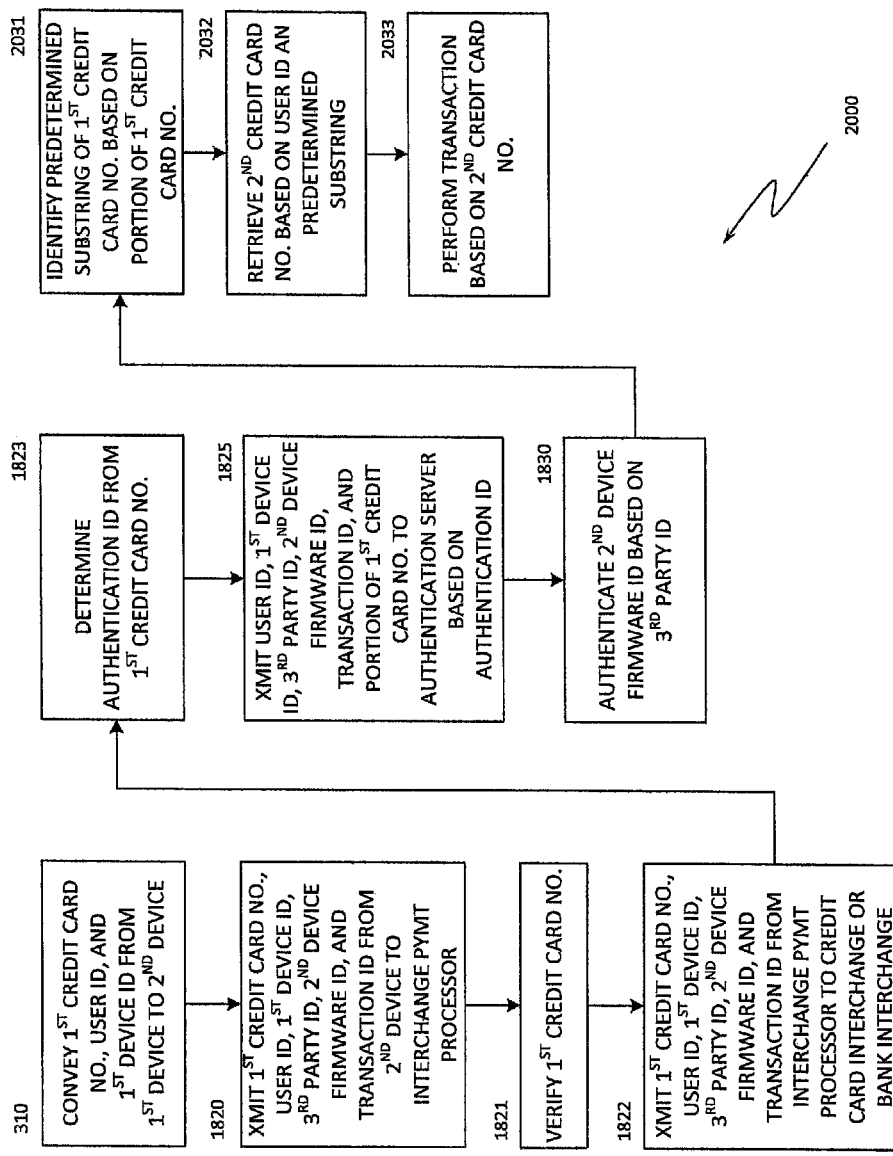
FIG. 20 is a flow chart of an ID/credential transmitting process using a first interchange device and extracting information from a card number according to yet another embodiment of the present subject matter.

FIG. 20 illustrates a flow chart 2000 of an ID/credential transmitting process using a first interchange device and extracting information from a card number according to yet another embodiment of the present subject matter. In FIG. 20, blocks 310, 1820, 1821, 1822, 1823, 1825, and 1830 are the same as the corresponding blocks discussed above with respect to FIG. 18. However, after the second device firmware identifier is authenticated based on the third party identifier in block 1830, at block 2031, a predetermined substring of the first credit card number is identified based on at least a portion of the first credit card number. At block 2031, a second credit card number associated with the user is retrieved based on the user identifier and the predetermined substring. At block 2033, the transaction for the user is performed using the second credit card number.

Figure 21:
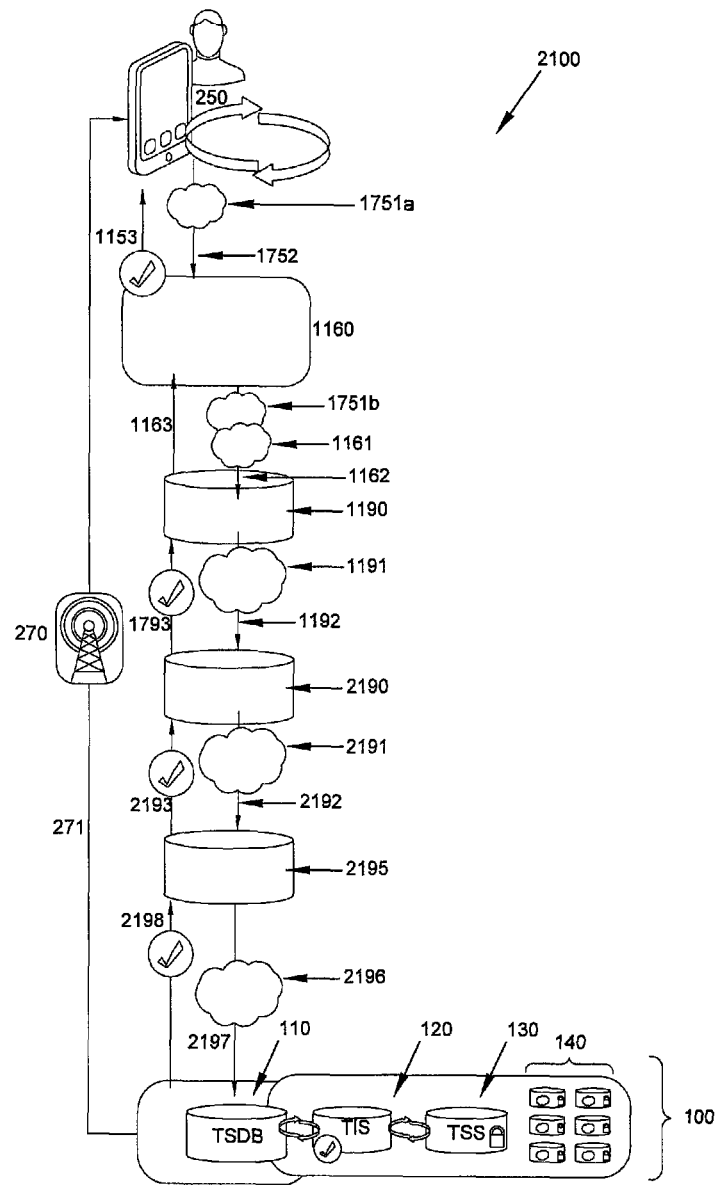
FIG. 21 is a functional block diagram of an ID/credential system illustrating a data/credential transmitting process using a first and second interchange device according to a further embodiment of the present subject matter.

FIG. 21 depicts a functional block diagram 2100 of an ID/credential system illustrating a data/credential transmitting process using a first and second interchange device according to a further embodiment of the present subject matter. In FIG. 21, the features designated 100, 110, 120, 130, 140, 250, 270, and 271 are as described above with respect to FIGS. 1 and 2, as appropriate. The features designated 1751*a*, 1751*b*, 1752, 1153, 1161, 1162, 1163, 1191, 1192, and 1793 are as described above with respect to FIG. 17. Additionally, FIG. 21 includes third party data device 1160 and interchange 1190 as described above with respect to FIG. 17. Also in FIG. 21, the features designated 1153, 1161, 1162, and 1163 are as described above with respect to FIG. 17. Furthermore, FIG. 21 also includes interchange 2190 which, in a particular embodiment, is a credit card and/or debit card interchange, and interchange 2195 which, in a particular embodiment, is a bank database and/or interchange, a credit card database and/or interchange, or an issuing bank database and/or interchange. For the discussion of the embodiment presented below, interchange 2190 will be referred to as credit card interchange 2190 and interchange 2195 will be referred to as bank interchange 2195.

To perform a transaction, the user conveys the data 1751*a* from the mobile device 250 to the third party data device 1160 by any conventional means known in the art, such as, but not limited to, NFC, optics, infrared, radio, wireless network, scanning a bar code, etc. This data conveyance is shown in FIG. 21 as arrow 1752. In the presently-described embodiment, the data 1751*a* includes a credit card number, a user ID (as described above), and a first device ID (i.e., the hardware ID and/or application ID for the mobile device 250). In an embodiment, the third party data device 1160 connects with the interchange 1190 after the user enters a PIN or similar code on the third party data device 1160 or on the mobile device 250.

Upon receiving data 1751*a* (which includes the PIN if entered on the mobile device 250), the third party data device 1160 connects with the interchange 1190. The third party data device 1160 transmits the data 1751*a* received from the mobile device 250 as data 1751*b* (which includes the PIN if entered on either the third party data device 1160 or the mobile device 250 as discussed above), as well as data 1161 which includes, for example, the third party data device's firmware ID and/or the third party data device's hardware ID, the third party data device's owner ID, and a transaction ID which includes information regarding the type of transaction requested. This data transmission is shown in FIG. 21 as arrow 1162.

The interchange 1190 receives the data 1151*b* and data 1161 and processes the data and recognizes therefrom that the transaction request is a credit card transaction due to the presence and verification of the credit card number. The interchange 1190 then routes the data 1151*b* and data 1161, represented together as data 1191, to the credit card interchange 2190. This data transmission is shown in FIG. 21 as arrow 1192.

At the credit card interchange 2190, an issuer ID is determined from the credit card number in the received data 1191. The issuer ID identifies the entity (bank, credit card company, etc.) that issued the credit card number. The credit card interchange 2190 then transmits received data 1191 as data 2191 to the bank interchange 2195 associated with the determined issuer ID. This data transmission is shown in FIG. 21 as arrow 2192. At the bank interchange 2195, an authentication ID is determined from the credit card number, as is known in the art. Additionally, the bank interchange 2195 recognizes that the credit card transaction is a Tango transaction and then transmits the received data 2191 as data 2196 to the TSDB 110 (as discussed above in other embodiments, the information/data received by the TSDB will include a request for a transaction and a request for data verification). This data transmission is shown in FIG. 21 as arrow 2197.

The TSDB 110 passes the information received from the bank interchange 2195 to the TIS 120 which authenticates that data 2196 (i.e., 1751*b* and data 1161) are authorized. In an embodiment, the User ID, the application ID, and user-specific identifier data in data 1751*b* are authenticated and the third party data device's firmware ID, the third party data device's hardware ID, and the third party data device's owner ID in data 2196 are authenticated, and the transaction ID in data 1161 is verified and approved. In an embodiment, the verification and approval of the transaction is based at least in part on the stored profile for the third party data device's owner (accessed by the third party data device's owner ID). Additionally, the TSDB 110 may store any incoming data from data 1751*b* and data 1161 such as, but not limited to, any data required to complete the requested transaction (e.g., payment information, account numbers, date, etc.) Alternatively, the TIS 120 may cause the data required to complete the requested transaction to be stored in the TSS 130 or DSS 140.

If required by the type of transaction and/or in response to instructions from the user and/or the third party data device's owner (either stored in the TSE 100 prior to the transaction request or sent to the TSDB 110 during the transaction request as, for example, part of data 1751*a* and/or 1751*b*), the TIS 120, via the TSDB 110, contacts the mobile device 250 via the network connection 270 (shown as arrow 271) to verify the user's authorization for the requested transaction. Alternatively, the TIS 120, via the TSDB 110, contacts the mobile device 250 via the bank interchange 2195 (arrow 2198), the credit card interchange 1790 (arrow 2193), interchange 1190 (arrow 1793), and the third party data device 1160 (arrow 1163) which then interacts with the mobile device 250 (arrow 1153). In an embodiment, the user receives the verification request on the mobile device 250, enters a reply into the mobile device 250 such as, but not limited to, a PIN, a password, a code, or other manually-entered authorization and sends that authorization from the mobile device 250 to the TSDB 110 via the network connection 270 (shown by arrow 271). The TSDB 110 then passes this information to the TIS 120.

Once the TIS 120 receives the above-mentioned data and authorizations and authenticates and approves the transaction, the TIS retrieves any additional stored data necessary for the transaction from the TSS 120 and/or the DSS 140. The TIS 120 then sends information necessary to complete the requested transaction, via the TSDB 110, to the credit card interchange 1790 (arrow 1794) which sends it on to interchange 1190 (arrow 1793) which sends it on to the third party data device 1160 (arrow 1163) which sends it on to the mobile device 250 (arrow 1153). In an embodiment, the TSDB 110 stores some or all of the following transaction data: the User ID, the application ID, the credit card data, the third party data device firmware ID, the third party data device hardware ID, the third party data device owner ID, and the transaction ID.

Figure 22:
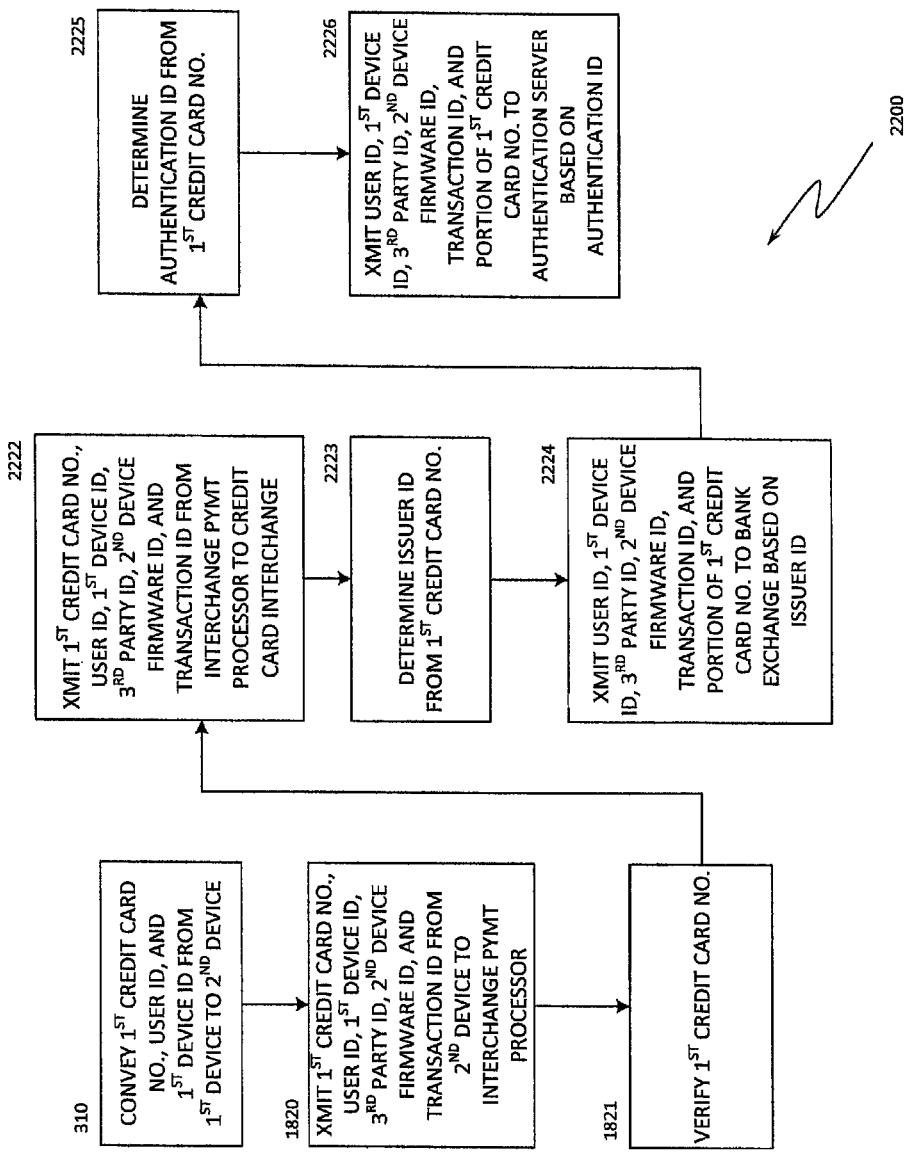
FIG. 22 is a functional block diagram of an ID/credential system illustrating a data/credential transmitting process using a first and second interchange device according to still another embodiment of the present subject matter.

FIG. 22 represents a functional block diagram 2200 of an ID/credential system illustrating a data/credential transmitting process using a first and second interchange device according to still another embodiment of the present subject matter. In FIG. 22, blocks 310, 1820, and 1821 are the same as the corresponding blocks discussed above with respect to FIG. 18. At block 2222, the first credit card number, the user identifier, the first device identifier, the third party identifier, the second device firmware identifier, and the transaction type identifier are transmitted from the interchange payment processor 1190 to a credit card interchange 2190. At block 2223, the credit card interchange 2190 determines an issuer identifier from the first credit card number. At block 2224, the user identifier, the first device identifier, the third party identifier, the second device firmware identifier, the transaction type identifier, and at least a portion of the first credit card number are transmitted to a bank interchange 2195 associated with an issuer bank identified by the issuer identifier. At block 2225, an authentication identifier from the first credit card number is determined at the bank interchange. At block 2226, the user identifier, the first device identifier, the third party identifier, the second device firmware identifier, the transaction type identifier, and said at least a portion of the first credit card number is transmitted to an authentication server (e.g., TSE 100 via TSDB 110 in FIG. 21) specified by the determined authentication identifier.

Figure 23:
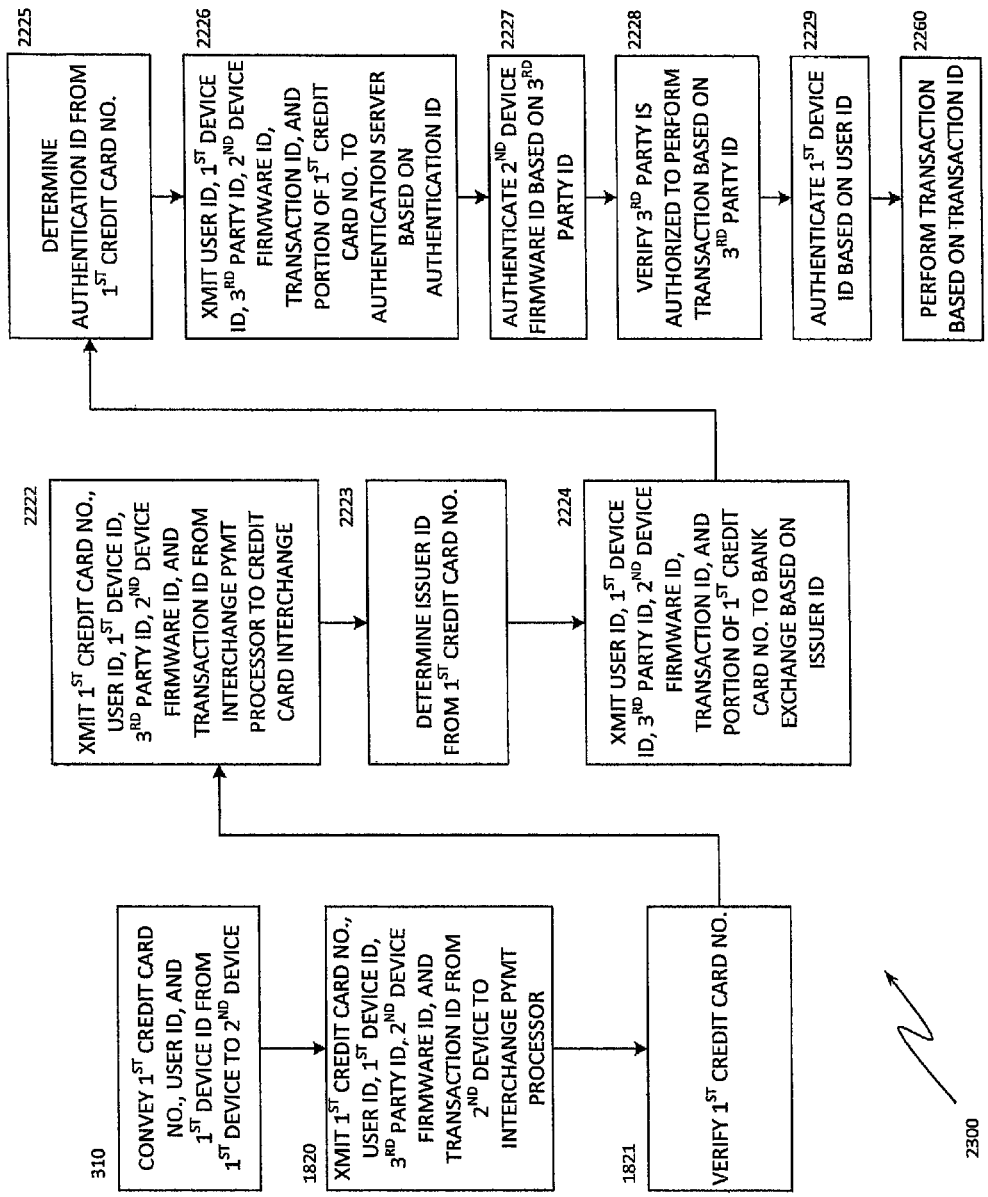
FIG. 23 is a functional block diagram of an ID/credential system illustrating a data/credential transmitting process using a first and second interchange device with authentication according to yet still another embodiment of the present subject matter.

FIG. 23 describes a functional block diagram 2300 of an ID/credential system illustrating a data/credential transmitting process using a first and second interchange device with authentication according to yet still another embodiment of the present subject matter. In FIG. 23, blocks 310, 1820, 1821, 2222, 2223, 2224, 2225, and 2226 are the same as the corresponding blocks discussed above with respect to FIG. 22. At block 2227, the second device firmware identifier is authenticated, at a computer processor of the authentication server (e.g., TIS 120) based on the third party identifier. At block 2228, a verification is performed to determine that a third party is authorized to perform the requested transaction type for the user, where the verification is based on the third party identifier. At block 2229, the first device identifier is authenticated based on the user identifier. At block 2260, a transaction is performed for the user corresponding to the requested transaction type.

Portions of the present disclosure may be implemented by a general purpose computer programmed in accordance with the principles discussed herein. It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

Embodiments of the subject matter and the functional operations described in this specification can be implemented in digital electronic circuitry, or in computer firmware or hardware, including the structures disclosed in this specification and their structural equivalents, or in combinations of one or more of them. The term "processor" encompasses all apparatus, devices, and machines for processing data, including by way of example a programmable processor, a computer, or multiple processors or computers.

To provide for interaction with a user, embodiments of the subject matter described in this specification can be implemented on a computer having a display device, e.g., a cathode ray tube (CRT) or liquid crystal display (LCD) monitor, for displaying information to the user and a keyboard and a pointing device, e.g., a mouse, trackpad, touch screen, or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the claimed subject matter, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be perfoinied in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

While some embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

I claim:

1. A method comprising:

wirelessly conveying first data, a user identifier, and an application identifier from a first device to a second device, wherein the first data is based on confidential data of a user and the user identifier is unique to the user;

transmitting, from the second device to an authentication server, the first data, the user identifier, the application identifier, a second device hardware identifier, a third party identifier, a second device firmware identifier, and a transaction type identifier corresponding to a requested transaction type;

at a computer processor of the authentication server, authenticating the second device hardware identifier and the second device firmware identifier based on the third party identifier;

verifying that a third party is authorized to perform the requested transaction type for the user, wherein said verifying is based on the third party identifier;

authenticating the first data and application identifier based on the user identifier; and performing a transaction for the user corresponding to the requested transaction type.

2. The method of claim 1, wherein the application identifier is based on a unique identifier of the first device, a software identifier corresponding to software running on the first device, and an authentication identifier.

3. The method of claim 1, wherein said authenticating the second device hardware identifier and the second device firmware identifier based on the third party identifier includes:

accessing a third party data table indexed by the third party identifier; and verifying that the second device hardware identifier and second device firmware identifier are stored in the third party data table.

4. The method of claim 1, wherein said authenticating the first data and the application identifier based on the user identifier includes:

accessing a user data table indexed by the user identifier; and verifying that the application identifier is stored in the user data table.

5. The method of claim 1, wherein said wirelessly conveying the first data, the user identifier, and the application identifier includes:

displaying a barcode on the first device, wherein the barcode includes an encoded representation of the first data, a user identifier, and an application identifier; and scanning the barcode with the second device.

6. The method of claim 1, wherein said wirelessly conveying includes transmitting via near field communication (NFC).

7. The method of claim 1, further comprising:

wirelessly transmitting an electronic message from the authentication server to the first device, wherein the message includes a request for user authorization of a release of user data associated with the transaction;

receiving an indication of user authorization of the release of the user data associated with the transaction;

wherein the transaction is performed for the user based on the received indication of user authorization of the release of the user data.

8. The method of claim 1, further comprising:

transmitting an electronic message from the authentication server to an entity computer of an entity, wherein the electronic message includes a request for second data;

at the authentication server, receiving the second data from the entity computer;

wherein the transaction is performed for the user based on the second data.

9. The method of claim 1, further comprising:

transmitting an electronic message from the authentication server to an entity computer of an entity, wherein the electronic message includes a request for authorization of the requested transaction;

at the authentication server, receiving an electronic authorization from the entity computer;

wherein the transaction is performed for the user responsive to the received authorization from the entity computer.

10. The method of claim 1, further comprising:

transmitting an electronic message from the authentication server to an entity computer of an entity, wherein the electronic message includes updated transaction data for storage at the entity computer.

11. The method of claim 1, further comprising:

transmitting a first electronic message from the authentication server to an entity computer of an entity, wherein the first electronic message includes a notification of the requested transaction;

at the authentication server, receiving a second electronic message from the entity computer, wherein the second electronic message includes update data; and transmitting the update data to at least one of the first and second devices.

12. The method of claim 1, wherein the first data is a result of processing the confidential data of the user and the user identifier with a hash function.

13. The method of claim 1, wherein the first data is a result of processing the confidential data of the user with a hash function.

14. The method of claim 1, further comprising:

receiving a PIN at the second device;

transmitting the PIN from the second device to the authentication server; and authenticating the PIN based on the user identifier.

15. The method of claim 14, wherein the PIN is received wirelessly from the mobile device.

16. The method of claim 1, wherein the transaction is a payment transaction and the confidential data of the user includes account information.

17. A method comprising:

wirelessly conveying first data, a user identifier, and a first device identifier from a first device to a second device, wherein the first data is based on confidential data of a user and the user identifier is unique to the user;

transmitting, from the second device to an interchange payment processor, the first data, the user identifier, the first device identifier, a third party identifier, a second device firmware identifier, and a transaction type identifier corresponding to a requested transaction type;

transmitting the first data, the user identifier, the first device identifier, the third party identifier, the second device firmware identifier, and the transaction type identifier from the interchange payment processor to an authentication server;

at a computer processor of the authentication server, authenticating the second device firmware identifier based on the third party identifier;

verifying that a third party is authorized to perform the requested transaction type for the user, wherein said verifying is based on the third party identifier;

authenticating the first data and the first device identifier based on the user identifier; and performing a transaction for the user corresponding to the requested transaction type.

18. The method of claim 17, wherein the first data includes an authentication identifier, the method further comprising:

identifying the authentication identifier at the interchange payment processor;

wherein the first data, the user identifier, the first device identifier, the third party identifier, the second device firmware identifier, and the transaction type identifier are transmitted to the authentication server at a network address based on the authentication identifier.

19. The method of claim 17, further comprising:

transmitting an authentication identifier from the second device to the interchange payment processor;

wherein the first data, the user identifier, the first device identifier, the third party identifier, the second device firmware identifier, and the transaction type identifier are transmitted to the authentication server at a network location based on the authentication identifier.

20. The method of claim 19, further comprising transmitting the authentication identifier from the first device to the second device.

21. The method of claim 17, further comprising:

transmitting a second device hardware identifier from the second device to the authentication server via the interchange payment processor; and authenticating the second device hardware identifier based on the third party identifier.

22. A method comprising:

wirelessly conveying a first credit card number, a user identifier, and a first device identifier from a first device to a second device, wherein the user identifier is unique to a user;

transmitting, from the second device to an interchange payment processor, the first credit card number, the user identifier, the first device identifier, a third party identifier, a second device firmware identifier, and a transaction type identifier corresponding to a requested transaction type;

verifying the first credit card number at the interchange payment processor;

transmitting the first credit card number, the user identifier, the first device identifier, the third party identifier, the second device firmware identifier, and the transaction type identifier from the interchange payment processor to one of a credit card interchange and a bank interchange;

at said one of a credit card interchange and a bank interchange, determining an authentication identifier from the first credit card number;

transmitting the user identifier, the first device identifier, the third party identifier, the second device firmware identifier, the transaction type identifier, and at least a portion of the first credit card number to an authentication server specified by the authentication identifier;

at a computer processor of the authentication server, authenticating the second device firmware identifier based on the third party identifier;

performing a transaction for the user corresponding to the requested transaction type.

23. The method of claim 22, further comprising:

verifying that a third party is authorized to perform the requested transaction type for the user, wherein said verifying is based on the third party identifier; and authenticating the first device identifier based on the user identifier.

24. The method of claim 22, further comprising:

based on the at least a portion of the first credit card number, identifying a predetermined substring of the first credit card number;

based on the user identifier and the predetermined substring, retrieving a second credit card number associated with the user; and performing the transaction for the user using the second credit card number.

25. The method of claim 22, wherein said one of a credit card interchange and a bank interchange is a credit card interchange.

26. The method of claim 22, wherein said verifying the first credit card number includes determining an issuer identifier, and said one of a credit card interchange and a bank interchange is a bank interchange associated with an issuer bank identified by the issuer identifier.

27. A method comprising:

wirelessly conveying a first credit card number, a user identifier, and a first device identifier from a first device to a second device, wherein the user identifier is unique to a user;

transmitting, from the second device to an interchange payment processor, the first credit card number, the user identifier, the first device identifier, a third party identifier, a second device firmware identifier, and a transaction type identifier corresponding to a requested transaction type;

verifying the first credit card number at the interchange payment processor;

transmitting the first credit card number, the user identifier, the first device identifier, the third party identifier, the second device firmware identifier, and the transaction type identifier from the interchange payment processor to a credit card interchange;

at the credit card interchange, determining an issuer identifier from the first credit card number;

transmitting the user identifier, the first device identifier, the third party identifier, the second device firmware identifier, the transaction type identifier, and at least a portion of the first credit card number to a bank interchange associated with an issuer bank identified by the issuer identifier;

at the bank interchange, determining an authentication identifier from the first credit card number;

transmitting the user identifier, the first device identifier, the third party identifier, the second device firmware identifier, the transaction type identifier, and said at least a portion of the first credit card number to an authentication server specified by the authentication identifier.

28. The method of claim 27, further comprising:

at a computer processor of the authentication server, authenticating the second device firmware identifier based on the third party identifier;

verifying that a third party is authorized to perform the requested transaction type for the user, wherein said verifying is based on the third party identifier;
authenticating the first device identifier based on the user identifier; and
performing a transaction for the user corresponding to the requested transaction type.

\* \* \* \* \*